(12) United States Patent
Sakano et al.

(10) Patent No.: US 7,302,176 B2
(45) Date of Patent: Nov. 27, 2007

(54) OPTICAL NETWORK

(75) Inventors: Shinji Sakano, Kamakura (JP); Yasushi Sawada, Yokohama (JP); Hideaki Tsushima, Komae (JP); Yoshiaki Ikoma, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 364 days.

(21) Appl. No.: 10/853,864

(22) Filed: May 26, 2004

(65) Prior Publication Data

US 2004/0213564 A1    Oct. 28, 2004

Related U.S. Application Data

(63) Continuation of application No. 09/766,817, filed on Jan. 22, 2001, now abandoned.

(30) Foreign Application Priority Data

Mar. 4, 2000    (JP) .............................. 2000-100361

(51) Int. Cl.
*G02F 1/00* (2006.01)
*H04B 10/12* (2006.01)
*H04B 10/00* (2006.01)

(52) U.S. Cl. .................. 398/5; 398/3; 398/4; 398/148; 398/159

(58) Field of Classification Search .............. 398/3, 398/4, 5, 147, 148, 12, 19, 158, 159
See application file for complete search history.

(56) References Cited

U.S. PATENT DOCUMENTS 6,259,543 B1 *    7/2001    Golovchenko et al. ....... 398/26

6,579,018 B1 *    6/2003    Li et al. ........................ 398/4
6,701,085 B1 *    3/2004    Muller ............................ 398/4

FOREIGN PATENT DOCUMENTS

| CA | 2412276 | 2/1999 |
|----|---------|--------|
| JP | 6-216920 | 8/1994 |
| JP | 09-172448 | 6/1997 |
| JP | 11-331224 | 11/1999 |
| JP | 2000-501909 | 2/2000 |
| WO | WO97/22190 | 6/1997 |
| WO | WO99/40697 | 8/1999 |

* cited by examiner

*Primary Examiner*—M. R. Sedighian
(74) *Attorney, Agent, or Firm*—Knoble Yoshida & Dunleavy, LLC

(57) ABSTRACT

A medium-scale IP telecommunications network is configured in a low-cost optical network with good reliability and expandability. A physical configuration example has a center node 2-1 and eight local nodes 2-11 through 2-18 connected in one OADM ring 2-21/2-22. The logical configuration is a star configuration with the central node 2-1 at its origin with all traffic passing through the center node 2-1. The local nodes 2-11 through 2-18 are connected to the central node 2-1 by wavelength-unit optical channels or optical paths λ1 through λ8. Channels are added as required. Initially, for example, the center node 2-1 and the local node 2-5 are connected by λ5, but λ13 can added when the need arises. Since the logical star network is limited to approximately two add/drop optical channels at local nodes, costs are reduced by using inexpensive filters (e.g., dielectric interference film filters or fiber Bragg reflectors) that are capable of extracting only the specific wavelength of the optical channel. High reliability is provided through the use of optical switches for correction of fiber transmission path failures.

27 Claims, 25 Drawing Sheets

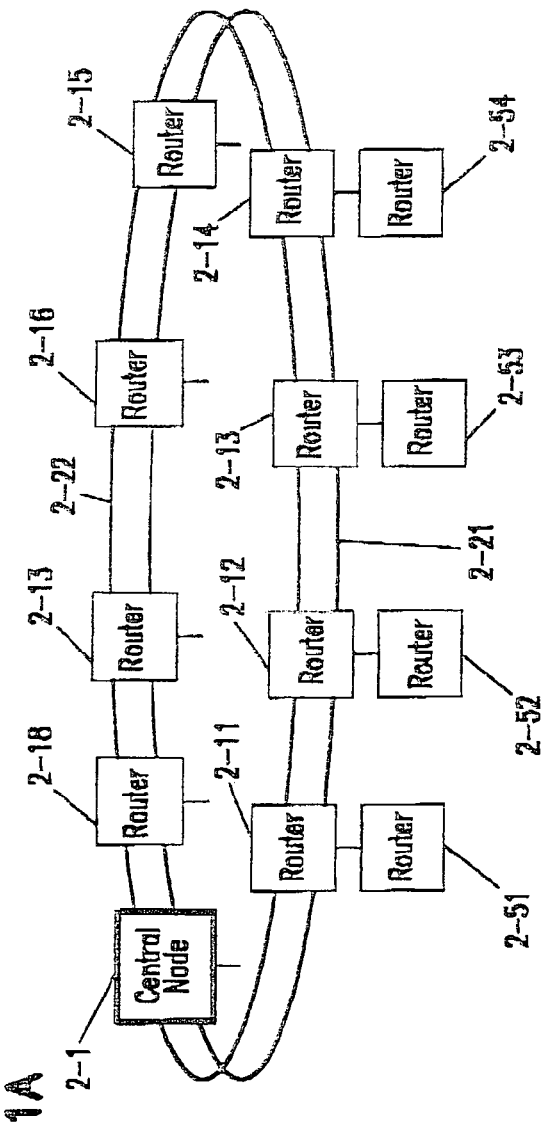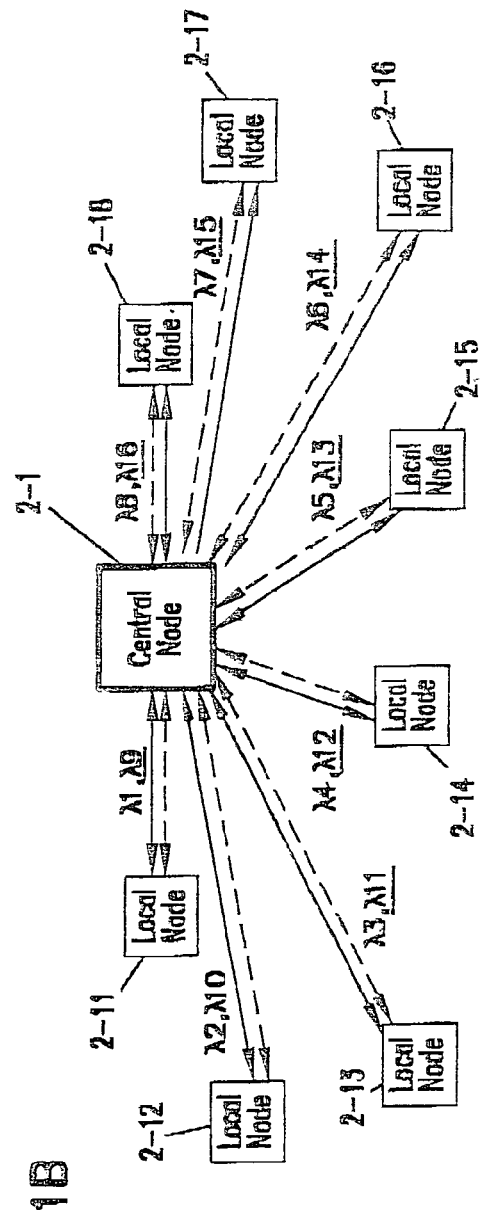
FIG. 1A
FIG. 1B

FIG. 19

OPTICAL NETWORK

This is a continuation of prior application Ser. No.: 09/766,817 filed on Jan. 22, 2001 now abandoned under 35 CFR 1.53(b)

BACKGROUND OF THE INVENTION

The present invention is related to optical networks, and in particular, to low-cost, general-use optical networks suitable for transmission of traffic using Internet Protocol (IP).

Prior optical network technology was designed primarily for voice communication. Such voice communication (telephone circuits, etc.) employed a guaranteed service mode in which a complete communication path between the users at both ends was guaranteed for the duration of the call. In this guaranteed service mode, specific users were guaranteed a specific bandwidth for the duration of the call, regardless of actually transmitted signals. Such guaranteed service required the construction of highly reliable and expensive optical networks with redundant paths to provide immediate recovery from fault conditions. Increased volume of communications over telephone circuits has advanced speed and capacity in optical network.

In recent years, data communication using Internet Protocol (IP) has experienced explosive growth and has rapidly replaced guaranteed service-type telephone circuits as the primary mode of communication. In Internet Protocol, when a signal 'packet' or a small chunk of data arrives a router, the router routes the packet to an open transmission path. This technique, in which a fixed communications path need not be established between end users is called a 'connectionless' network protocol. Connectionless systems have reduced costs because multiple users share the same signal bandwidth. This system also features rapid recovery from faults. When a fault occurs in a given path, after short delay to adjusted signal flow between routers, the affect signals are routed through a different path.

Because data communications systems using Internet Protocol are capable of handling multimedia signals, there has been a growing demand in data capacity not only for text, but also for audio, graphic images, and video for personal computer communication. Because the growing demand, greater data transmission capacity as well as flexible expandability will be required. Also, the areas where data is transmitted have been expanding. Along with the need to connect more users over longer distance, there is also a growing demand for high capacity optical transmission of 100 Mbit/s-1 Gbit/s over distances ranging from a few tens of kilometers to a few hundred kilometers. In the past, optical transmission methods have primarily concentrated on guaranteed service-type communications links as generally used for telephone circuits to provide large capacity, high reliability, and high quality service. Prior technology has difficulties in providing cost reduction and flexibly responding to client demands.

From the start, large scale optical networks have included ring, bus, and star configurations. In general, optical network systems had to be capable of high-speed, high-capacity, high-reliability, and high-quality data transmission. For these reasons, to meet the speed and capacity requirements, optical network system designers tended to opt for techniques such as load distribution and function distribution. Also, to meet the reliability requirements, they used redundancy such as duplicate circuits, hot standby circuits, etc. while to meet the quality standards, they used QoS (quality of service) processes and TCP (transmission control protocol).

In the past, because their designers focused primarily on obtaining extremely high-speed, high-capacity, high-reliability and high-quality signal transmission, optical telephone networks tended to be too expensive for widespread use. The use of Internet (Internet Protocol) traffic has required less speed, capacity, reliability, and quality in internet-type communication than the conventional voice communication circuits. A practical optical network configuration is desired for Internet Protocol communication in mid-sized networks such as for use in covering metropolitan areas up to 200 km. A low-cost optical network configuration is also desired with sufficient reliability for data communication-using Internet Protocol without abnormal congestion under fault conditions. Also, in the past, because it was voice communication that determined the standards for telephone circuit networks, the required number of subscriber lines for such networks could be accurately predicted from the number of residences and offices in a given service area. However, because data networks handle everything from simple text to high quality video, networks now must have sufficient flexibility for expandability so as to accommodate a broad range of traffic volume at low cost. It is desired that optical networks have low initial costs, but are easily upgradeable for an operator to have a good cash flow.

In consideration of the above described issues, it is an object of the present invention to provide a low-cost optical network configuration for use primarily in medium-scale IP networks. It is a further object of the present invention to provide optical networks that will provide the client with the kind of signal capacity demanded by fast-changing IP networks.

provide the flexibility to support communication formats such as SONET and Ethernet require a lower initial capital investment provide sufficient expandability for growth, and provide steady cash flow.

It is a further object of the present invention to reduce total costs by making effective use of the limited bandwidth resources of optical networks. For optical transmission over distances in excess of 40 km, optical repeaters such as optical fiber amplifiers are required. In recent years, the use of EDFA (Erbium-Doped Fiber Amplifiers, that is made from silica fibers doped with erbium) as optical amplifiers has become commonplace. These optical amplifiers for a wavelength band range of 1530-1560 nm (C-band) have simple components, while it is technically feasible to build EDFAs that will amplify across the entire L-band (1570-1610 nm), the optical amplifiers for this range have complex components. In one possible optical network configuration for that wavelength band range, unless high-precision and expensive components known as wavelength lockers are used, the minimum wavelength separation that can be obtained is around 200 GHz. Therefore, in terms of a power of 2 the number of possible C-band or L-band wavelengths is about 16 channels or wavelengths at most. A way to make effective use of this limited [bandwidth] resource is desired.

It is also an object of the present invention to provide optical networks in which common components are used regardless of the types of signals connectable to the client, the types of signal transmission paths, or the usable bandwidth. Dispersion-shifted optical fibers are used in a transmission path to shift the zero-dispersion wavelength to near 1552 nm, where less expensive C-band optical components can be used. However, when a C-band wavelength division multiplex signal with equal wavelength spacing between channels is transmitted over 40 km in such a path at the normal optical transmission path levels recommended in ITU-T, a phenomenon known as 'four wave mixing' (an interference mode between two wavelengths) can occur. Four wave mixing causes overlapping of equally spaced signals, which degrades the optical transmission characteristics of the path. The problem, then, is to devise a way of using low-cost C-band optical components for wavelength-division multiplex transmission in dispersion-shifted optical fiber. One technology already established for eliminating the effects of the four wave mixing phenomenon is 'unequal spacing.' Because this technology requires specially designed optical components, it is not conducive to cost reduction. These are the issues that must be improved.

SUMMARY OF THE INVENTION

Following are some features of the present invention:
Optical switches are used for 'ring protection' in the IP optical transmission mode. This provides a flexible protection scheme that is independent of the service type or signal format of the client.
Connection management is made easier by the use of optical add/drop multiplexers in physical ring/logical star configurations.
Cost reduction is realized through the use of single wavelength insertion/extraction filters for specific wavelengths at local nodes.
Provides expandability through addition of single wavelength insertion/extraction filters for specific wavelengths at local nodes.
Fixed-connection channels and flexibly recombinable channels provide flexibility in additional channel assignment.
Dynamic optical switching functions are incorporated in additional channels.
Mesh connections are incorporated in additional channels.
Optical multicast functions are incorporated in additional channels
A 'traffic healing' configuration for multiple path connections provides high through-put during normal conditions and traffic healing during fault conditions.
The use of C-band (1530-1560 nm) in dispersion-shifted optical fiber allows the use of low-cost optical components.
In incorporating optical multicast and direct optical switching, optical amplifiers are added as required to eliminate drop signal loss and changes in optical level when optical paths are switched, thus avoiding variations in optical output.

According to a first aspect of the present invention for solving the problems, a wavelength division multiplexing optical network, including: a client; a plurality of redundant optical paths including a working path and a protection path; and a plurality of network nodes redundantly connected through the optical paths in a predetermined configuration, at least one of the network nodes being connected to the client, the network nodes transmitting and receiving optical signals with each other at a set of wavelengths, each of the network nodes further including; an optical add/drop multiplexer unit for converting a client optical signal at a first channel frequency from the client to a second channel frequency at one of the wavelengths to generate a converted client optical signal, the add/drop multiplexer unit splitting the converted client optical signal into split and converted redundant client optical signals for the optical paths, the add/drop multiplexer unit selectively multiplexing the split and converting redundant client optical signals to generate a wavelength division multiplexed optical signal, the add/drop multiplexer unit selectively demultiplexing the wavelength division multiplexed optical signal to generate a wavelength division demultiplexed optical signal; an optical signal failure detector connected to each of the optical paths for detecting a failure in the wavelength division demultiplexed optical signal to generate an optical path failure signal; and an optical switch unit connected to the optical paths in response to the optical path failure signal and having a first optical switch for switching from one of the optical paths to another of the optical paths.

According to a second aspect of the present invention for solving the problems, a wavelength division multiplexing optical network, including: a client; a plurality of optical paths including dispersion shifted fibers with zero chromatic dispersion at a wavelength near 1552 nm, the dispersion shifted fibers transmitting optical input signals that are multiplexed at 200 GHz interval within C-band having a wavelength range from 1530 nm to 1560 nm; and a plurality of network nodes connected through the optical paths in a predetermined configuration of a ring structure, at least one of the network nodes being connected to the client, the network nodes transmitting and receiving a plurality of optical signals with each other at a set of wavelengths; a router connected to each of the network nodes for selecting one of the optical paths for transmitting one of the optical signals; and an optical signal failure detector connected to each of the optical paths and the router for detecting a failure in the optical signal to generate an optical path failure signal for a particular one of the optical paths, wherein the router in response to the optical path failure signal switching from the particular one of the optical paths to another of the optical paths for transmitting the one of the optical signals, wherein each optical channel is less than −3.5 dBm, optical modulation speed is 2.48 Gbits/second, and inter-node span loss is less than 12 dB at 40 km.

According to a third aspect of the present invention for solving the problems a method of wavelength division multiplexing for an optical network, including: providing a plurality of redundant optical paths including a working path and a protection path as well as a plurality of network nodes redundantly connected through the optical paths in a predetermined configuration, at least one of the network nodes being connected to a client; transmitting and receiving optical signals to and from the network nodes at a set of wavelengths, the transmitting and receiving further including: converting a client optical signal at a first channel frequency from the client to a second channel frequency at one of the wavelengths to generate a converted client optical signal; splitting the converted client optical signal into splitted and converted redundant client optical signals for the optical paths; selectively multiplexing the split and converted redundant client optical signals to generate a wavelength division multiplexed optical signal; selectively demultiplexing the wavelength division multiplexed optical signal to generate a wavelength division demultiplexed optical signal; detecting a failure in the wavelength division demultiplexed optical signal to generate an optical path failure signal; and switching from one of the optical paths to another of said optical paths in response to the optical path failure signal.

According the a fourth aspect of solving problems, a method of wavelength division multiplexing for an optical network, including: providing a plurality of optical paths and a plurality of network nodes connected through the optical paths in a predetermined configuration, at least one of the network nodes being connected to a client; providing dispersion shifted fibers with zero chromatic dispersion at a wavelength near 1552 nm in the optical paths; transmitting and receiving a plurality of optical signals among the network nodes at a set of wavelengths; selecting one of the optical paths for transmitting one of the optical signals for optimal through traffic; detecting a failure in the optical signal to generate an optical path failure signal for particular one of the optical paths; and switching from the particular one of the optical paths to another of the optical paths for transmitting the one of the optical signals in response to the optical path failure signal, wherein the optical input signals are multiplexed at 200 GHz interval within C-band having a wavelength range from 1530 nm to 1560 nm in the dispersion shifted fibers, each optical channel being less than −3.5 dBm, optical modulation speed being 2.48 Gbits/second, inter-node span loss being less than 12 dB at 40 km.

BRIEF DESCRIPTION OF THE DRAWINGS

FIGS. 1A and 2B illustrates diagrams illustrating physical and logical connections two-fiber UPSR (unidirectional path switching ring).

FIGS. 2A and 2B illustrates diagrams illustrating physical and logical connections another two-fiber UPSR.

FIG. 19 is a diagram illustrating a main signal flow in main node of two-fiber UPSR network having optical add/drop multiplexers (1).

DESCRIPTION OF THE PREFERRED EMBODIMENTS

Figure 2A:
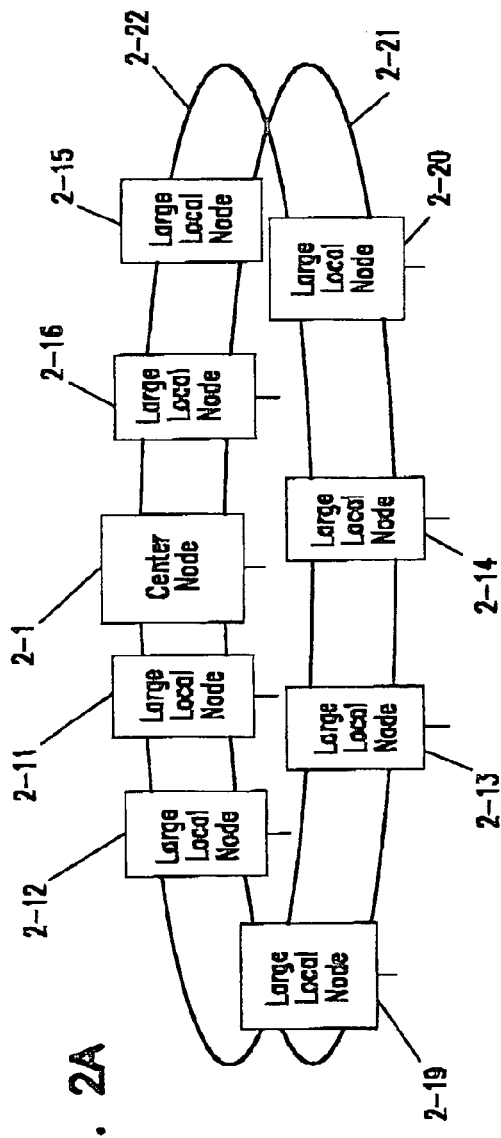

1. Optical Network Configurations (1) Optical Network Example 1

A two-fiber UPSR (unidirectional path switched ring) is configured as the ring network. Here, the term 'path,' is synonymous with optical channel. A diagram of the two-fiber UPSR is shown in FIG. 1. The two-fiber UPSR has one fiber ring 2-21 for the clockwise direction, and another fiber ring 2-22 for the counterclockwise direction. One fiber is used as a working path, while the other as a protection path. In a typical configuration, one center node 2-1 and a maximum of eight local nodes 2-11 through 2-18 are connected in OADM (optical add/drop multiplexer) rings 2-21, 2-22. In the present example, FIG. 1A shows the physical configuration that includes one central node 2-1 and eight local nodes 2-11 through 2-18. The logical configuration of the network is shown in FIG. 1B. In this example, the logical configuration is a star configuration with the central node as the common node through which all traffic must pass.

For the initial wavelength assignments between the central and local nodes, the local nodes 2-11 through 2-18 are connected to the central node 2-1 by the wavelength unit channels (optical paths) λ1 through λ8 (indicated by solid lines in the drawing). To add channels (e.g., to +1 wavelength), the wavelengths λ9 through λ16 (dotted lines) can be used to add optical channels as required. Initially, for example, the center node 2-1 and the local node 2-5 are connected by λ5, but λ13 can be added if required. The same applies to the other nodes. The logical star network provides efficient utilization of the limited optical channel resources. Limiting the add/drop optical channels to about two channels per logical star local node makes it possible to use inexpensive interference dielectric film filters and fiber Bragg reflectors to extract only a specific-wavelength channel. Thus the above described implementation reduces the costs.

Figure 2B:
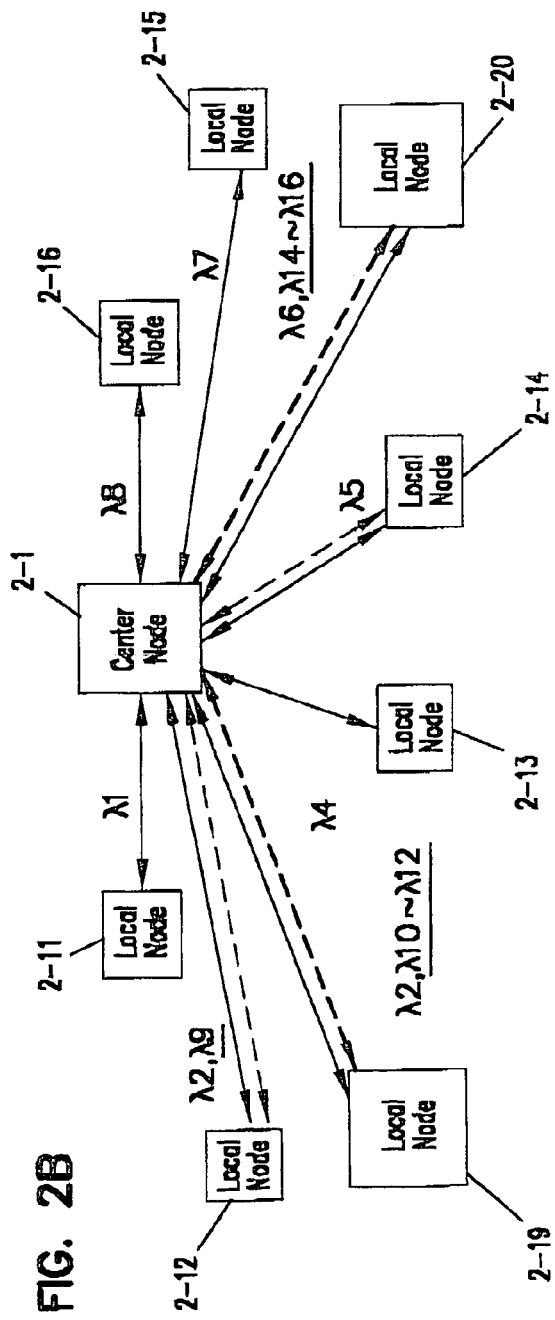

FIG. 2 shows another two-fiber UPSR configuration. The invention is not confined to application in the usual geographical urban configuration, in which the center node 2-1 is the sole large communication center with relative small nodes. FIG. 2 shows a configuration, for example that includes large local nodes 2-19 and 2-20 that can accommodate as many as 3-8 channels (as in the physical and logical configurations as respectively shown in FIGS. 2A and 2B). This example also uses a star configuration with a common central node (origin) through which all traffic must pass. Wavelength unit channels (optical paths) λ1 through λ8 (solid lines) are allocated for the initial wavelength assignments between the central and local nodes. To add channels to a large local node (e.g., up to +7), wavelengths up to λ16 (dotted lines) are used.

In addition to the fixed channel λ3, the added channels λ10 through λ12 (dotted lines) are connected between the central node 2-1 and the large local node 2-19. Channels λ14 through λ16 can be connected in addition to the fixed channel λ6 between the central node 2-1 and the large local node 2-20. Thus the maximum number of channels at a local node is selectable for improving its cost effectiveness over nodes having only two channels. By configuring additional large node combinations, ring networks have added flexibility at a lower total cost.

(2) Optical Network Example 2

Figure 3A:
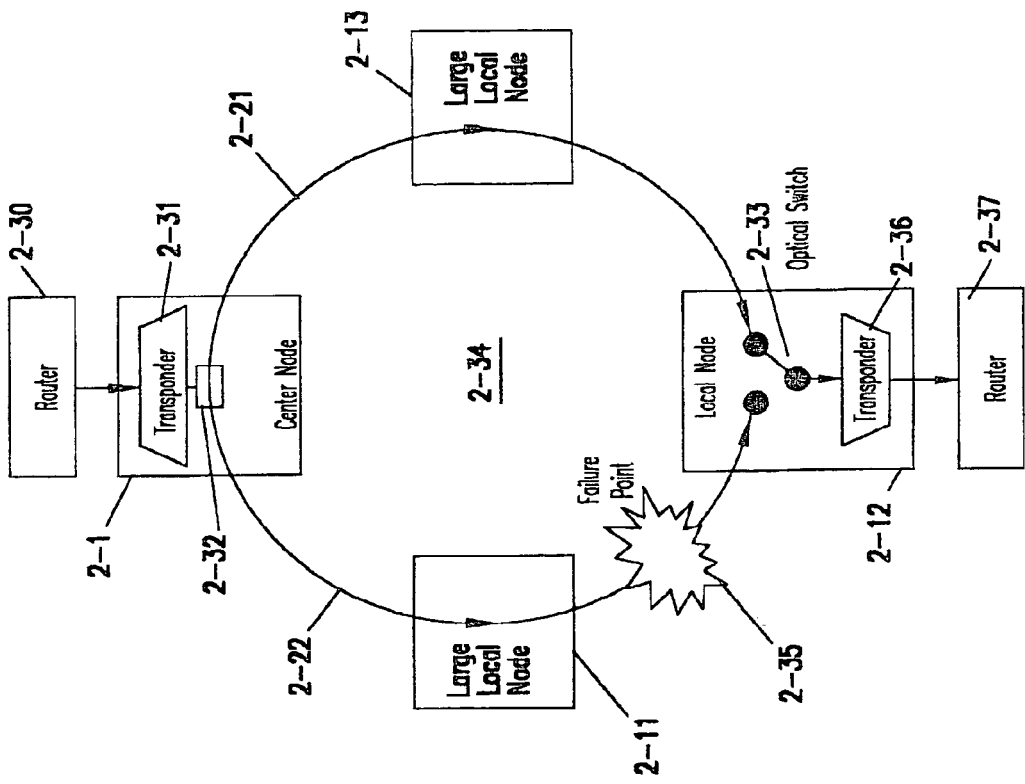
FIGS. 3A and 3B illustrates diagrams illustrating a two-fiber UPSR with protection path from central node 1 to local nodes.
Figure 3B:
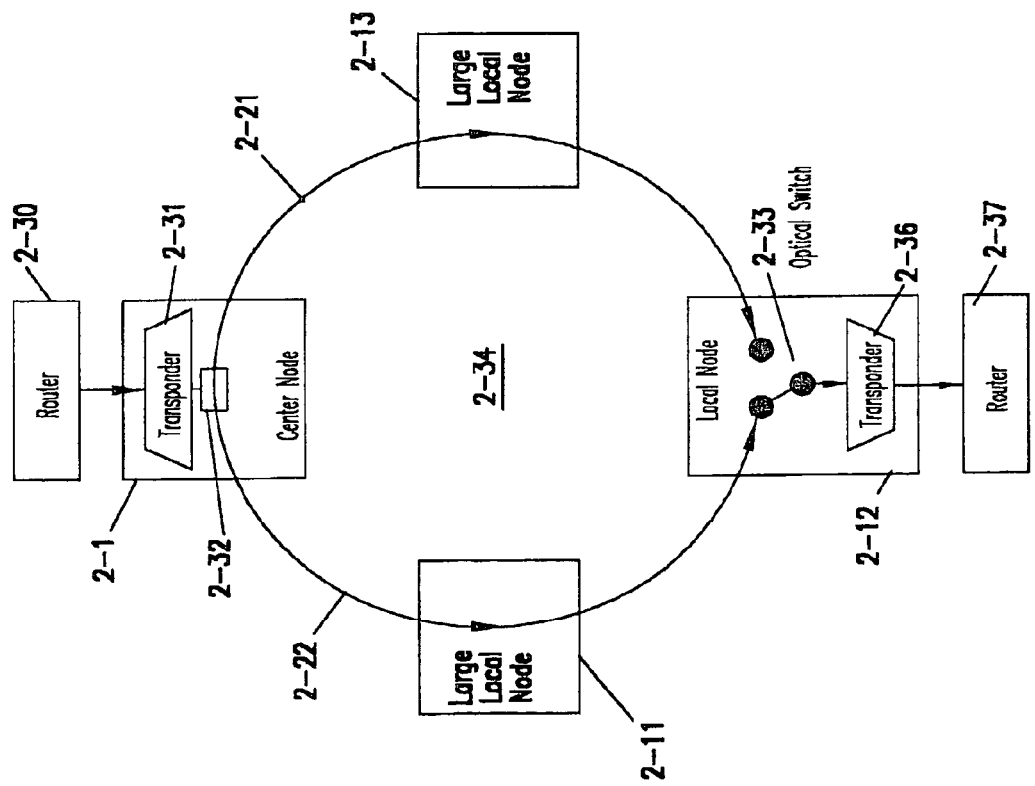

FIGS. 3A and 3B show a two-fiber UPSR configuration that has a protection path from the central node 2-1 to a local node 2-12. The two-fiber UPSR has one fiber 2-21 for the clockwise direction and the other fiber 2-22 for the counterclockwise direction. One fiber being used as a working path as shown in FIG. 3A while the other as a protection path as shown in FIG. 3B. If a failure occurs in the working path, the path is switched so that the signal can be received via the protection path that is the opposite direction path as shown in FIG. 3B. The system thus provides fault recovery for signals in the faulty span. In this example, an IP signal from a first router 2-30 is converted to a specific wavelength by a first transponder 2-31, and the signal is divided to travel the clockwise path 2-21 and counterclockwise path 2-22 by an optical divider 2-32. In the receive node 2-12, the optical signal is selected from the clockwise path 2-21 or counterclockwise path 2-22 by an optical switch 2-33, from which it is connected to a second transponder 2-36. The second transponder 2-36 converts the signal to the receive wavelength of a second router 2-37 and sends the output to the router 2-37. When an optical fiber path failure 2-35 occurs, the receive node 2-12 detects an optical input interruption and switches the optical switch 2-33 to receive the optical signal from the protection path 2-21. After a specific time period referred to as (1+1), the receive node 2-12 performs a non-switch-back path-switching operation.

(3) Optical Network Example 3

Figure 4:
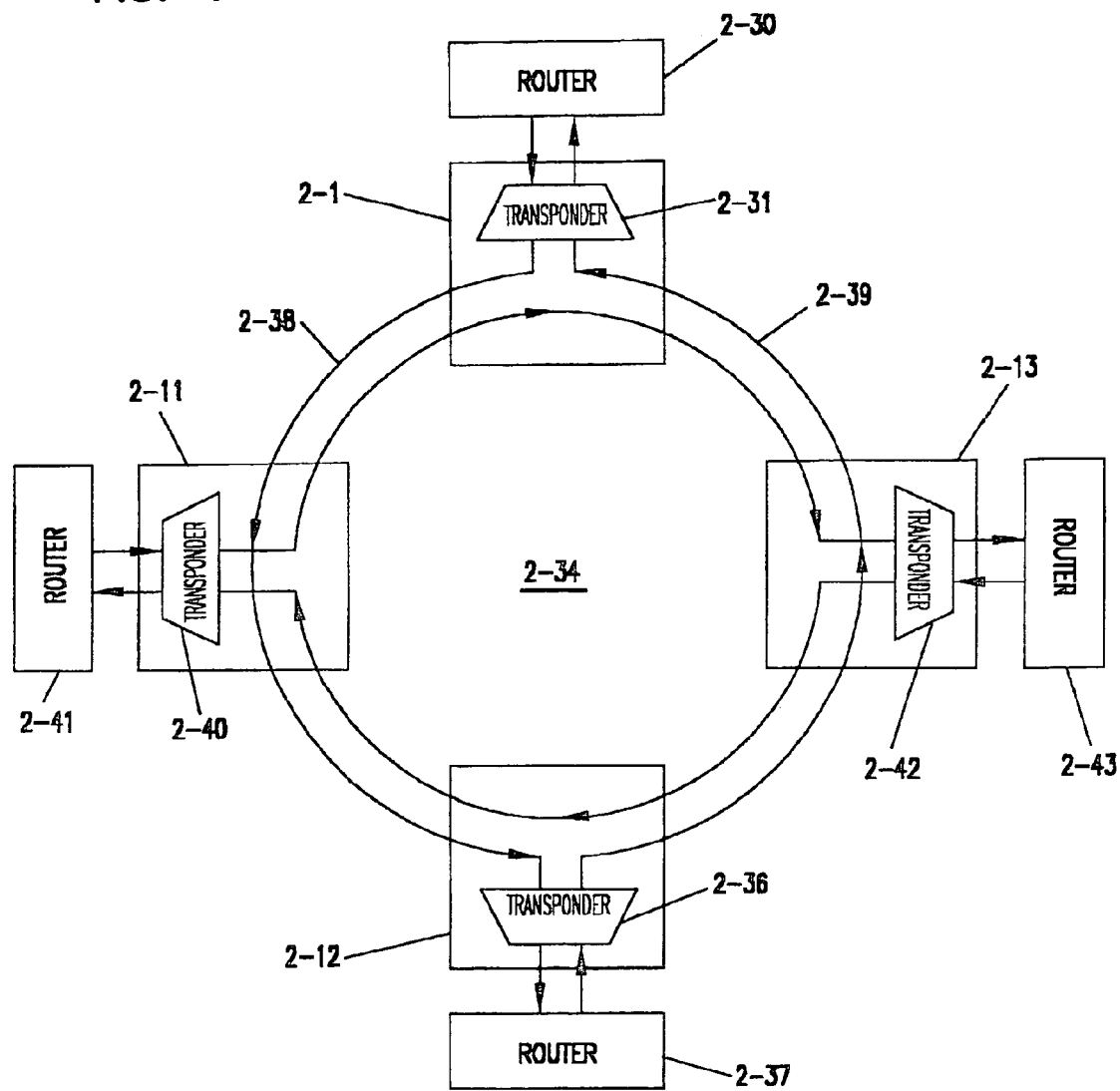
FIG. 4 illustrates a diagram illustrating a protectionless path configuration.

FIG. 4 shows a protectionless path network configuration. In this configuration, separate optical channels having the same wavelength are established. For example, in the connection from the central node 2-1 to the local node 2-12, or from the local node 2-12 to the central node 2-1, one data traffic travels in the fiber route 2-38 and the other in the fiber route 2-39. Thus, a double UPSR path is established. However, when there is a fault in either of the transmission route, no quick recovery is made due to the lack of protection.

(4) Optical Network Example 4

Figure 5:
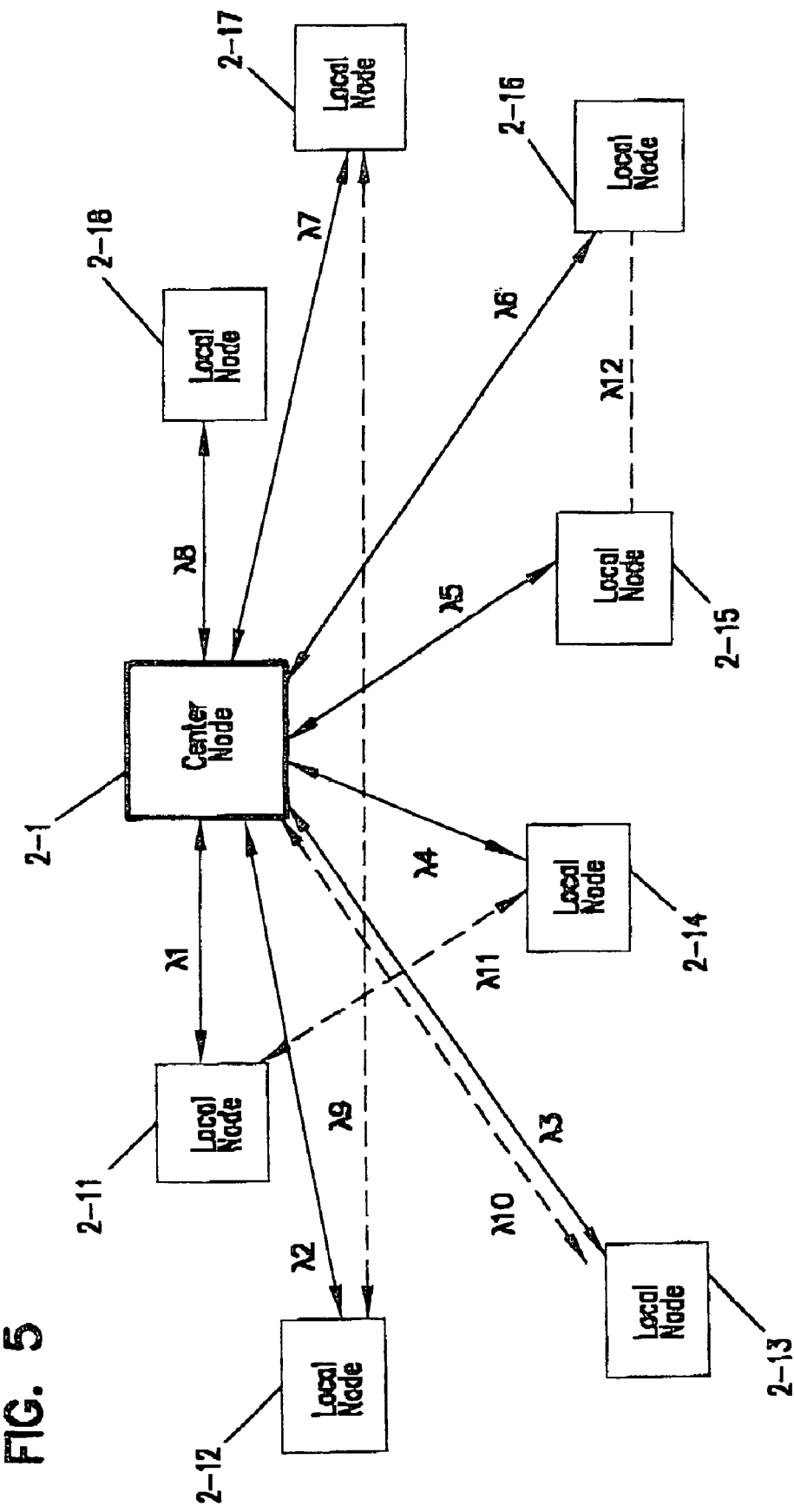
FIG. 5 illustrates a diagram illustrating a mixed logical star/logical mesh configuration.

FIG. 5 shows a combined logical-star/logical-mesh network configuration. Basically, an optical channel must be established between the central node 2-1 and each of the local nodes 2-11 through 2-18 in the logical star configuration This forces even a small amount of local-node-to-local-node signal traffic to be sent through the central node 2-1. That is, when heavy traffic occurs between pairs of local nodes such as between 2-11 and 2-14, 2-12 and 2-17, and 2-15 and 2-16 the configuration still routes everything through the central node 2-1 and optical channels of different wavelengths are required between the central node 2-1 and each of the local nodes. This uses up a large number of wavelength channels and also creates the need for a separate router at the central node 2-1 for signals that simply pass through it. By providing single direct optical channels between selected pairs of local nodes such as channels λ9, λ11, and λ12 between the local nodes 2-11 and 2-14, 2-12 and 2-17, and 2-15 and 2-16 as shown in dotted lines, we can avoid this wasteful use of channels and the expense of the additional router. This is accomplished by giving the central node 2-1 the capability to pass optical channels through it without going through channel terminations or optical transceivers. The capability to add wavelength channels to the local nodes 2-11 through 2-18 as desired is thus provided.

(5) Optical Network Example 5

Figure 6:
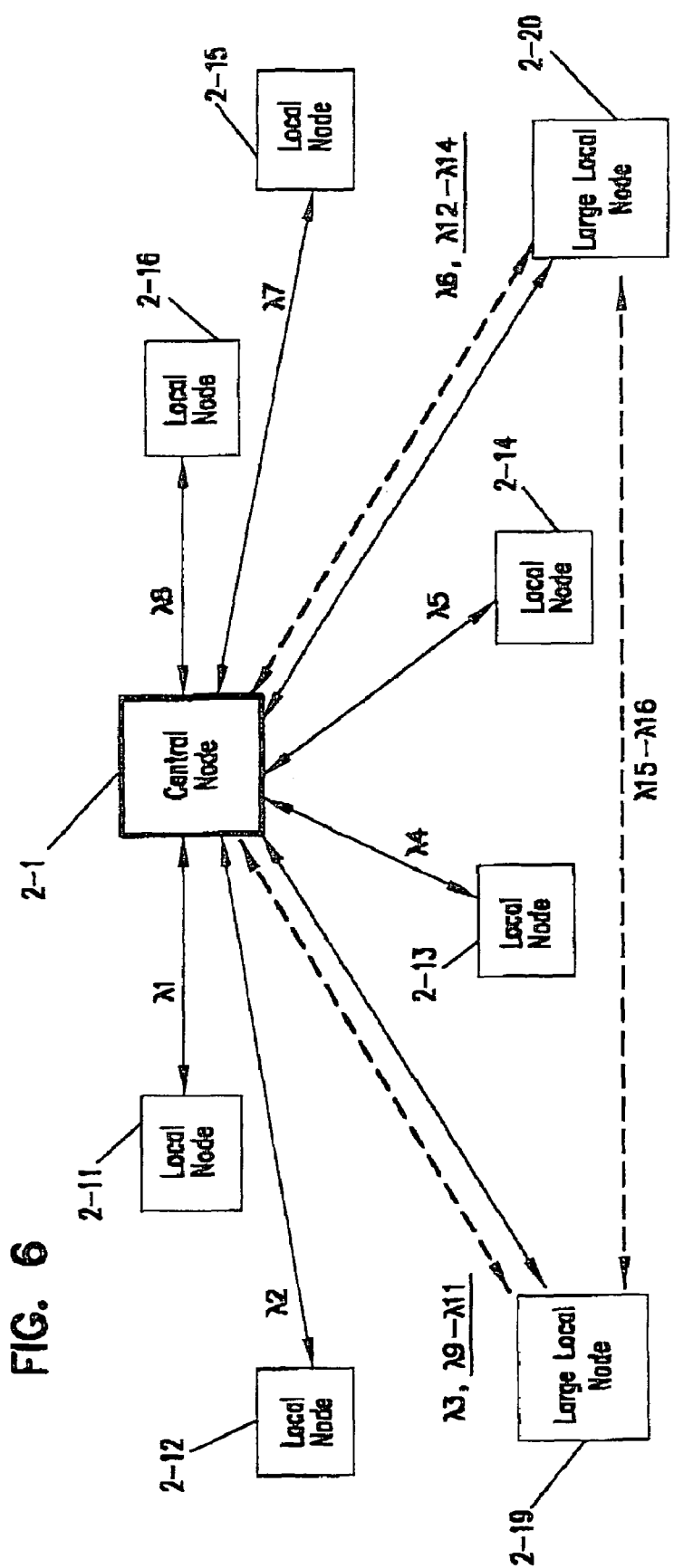
FIG. 6 illustrates a diagram illustrating a MPLS (multi-protocol labeled switching) support through direct optical switching.

FIG. 6 shows a direct optical switching network to support MPLS (multi-protocol labeled switching) traffic. The direct optical switching network provides the capability to support MPLS, which is required in Internet Protocol. To increase scalability, it uses optical switches to automatically establish optical channels by remote control. Basically, an optical channel must be established between the center node 2-1 and each of the local nodes 2-11 through 2-18 in the logical star configuration. In particular, a switching function with approximately 1 ms switching time is provided to add channels between-the center node 2-1 and two local nodes such as 2-19 and 2-20 as required to provide enough bandwidth to pass high volume MPLS-compliant IP signals. By establishing multiple wavelengths (e.g., λ9 through λ16) directly between three nodes (e.g. 2-1, 2-19, and 2-20) rather than by providing the required MPLS node-to-node capacity through various routings, the current invention reduces the number of routers required just for the routing of communications and the level of control required to enhance flexibility. This approach provides the high-capacity MPLS support by providing dynamic switching functions at specific nodes thus makes efficient use of the finite number of wavelengths such as 16 wavelengths available in the ring network. Changes to direct switching PCBs at the large nodes and augmentation of some control functions are performed as need dictates. Also, because signals will be degraded by losses incurred when they pass through wavelength add/drop and optical switch devices for dynamic switching. Optical amplifiers are installed to compensate for this dynamic switching loss.

(6) Optical Network Example 6

Figure 7:
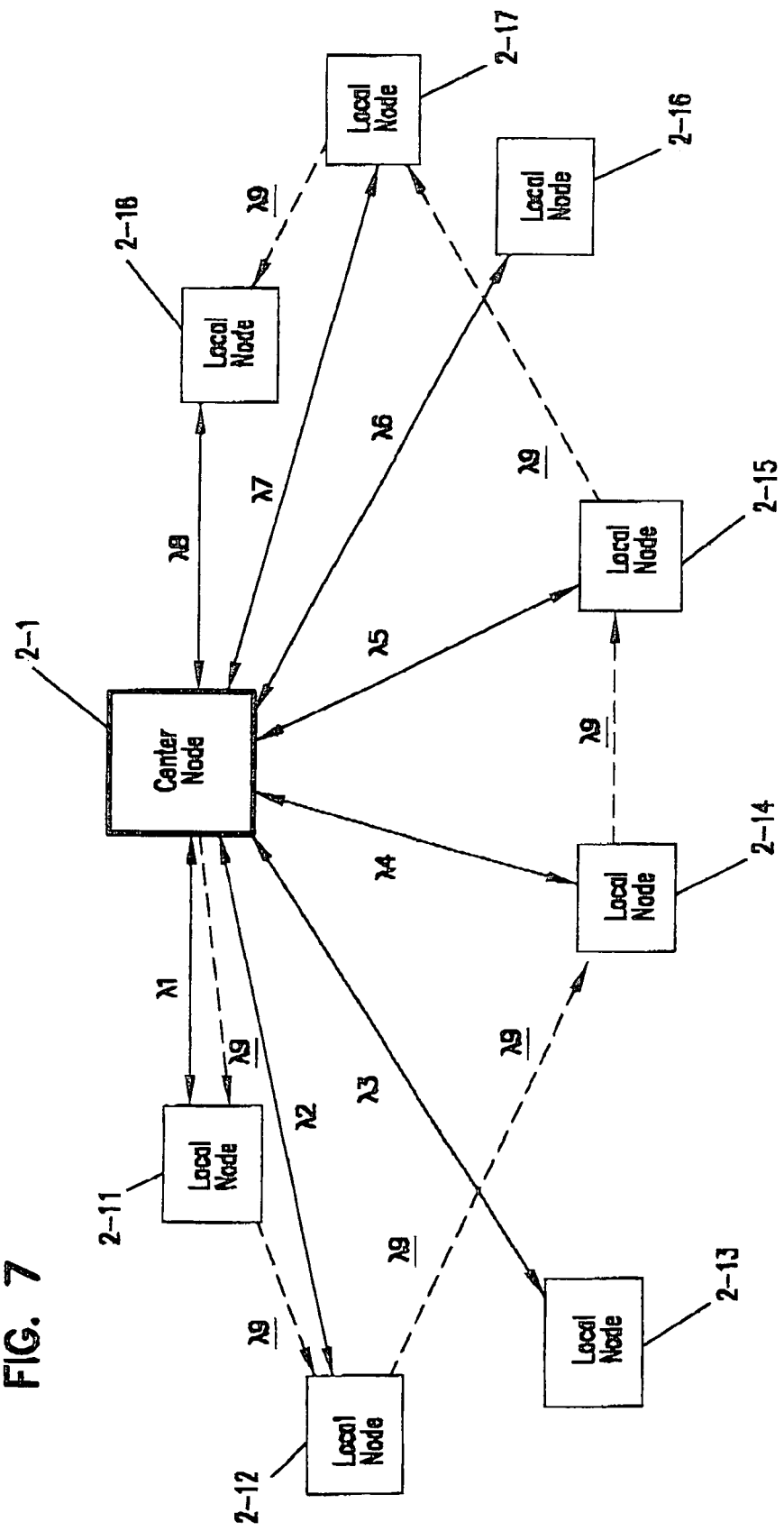
FIG. 7 illustrates a diagram illustrating a multicast support configuration.

FIG. 7 shows a configuration to support optical multicasting. IP routers have multicast functions, but delays by each extract/repeat process add up to the point where the delay time causes problems for some applications. High broadcast capability or capability to transmit simultaneously to a large number of nodes demands that the direct extract/repeat process be performed optically. Basically, an optical channel must be established between a center node 2-1 and each of the local nodes 2-11 through 2-18 in the logical star configuration. To distribute a signal from the center node 2-1 at which high broadcast capability is required, for example, the extract/repeat function would have to be performed at each of the local nodes 2-11, 2-12, 2-14,2-15, 2-17, and 2-18 that want to receive the signal in optical channel λ9. The last local node 2-18 may serve the termination point, but the termination node may also serve as a center node 2-1 so that distribution of signals is confirmed. Changing of multicast PCBs and augmentation of some control functions are performed as the need dictates. Because the drop/through process is optically performed on the multicast signal channel λ9 at each of the local nodes 2-11, 2-12, 2-14, 2-15, 2-17, and 2-18, it results in an optical power drop loss that degrades the signal. Therefore, optical amplifiers are provided at local nodes to compensate for the drop loss.

(7) Optical Network Example 7

Figure 8A:
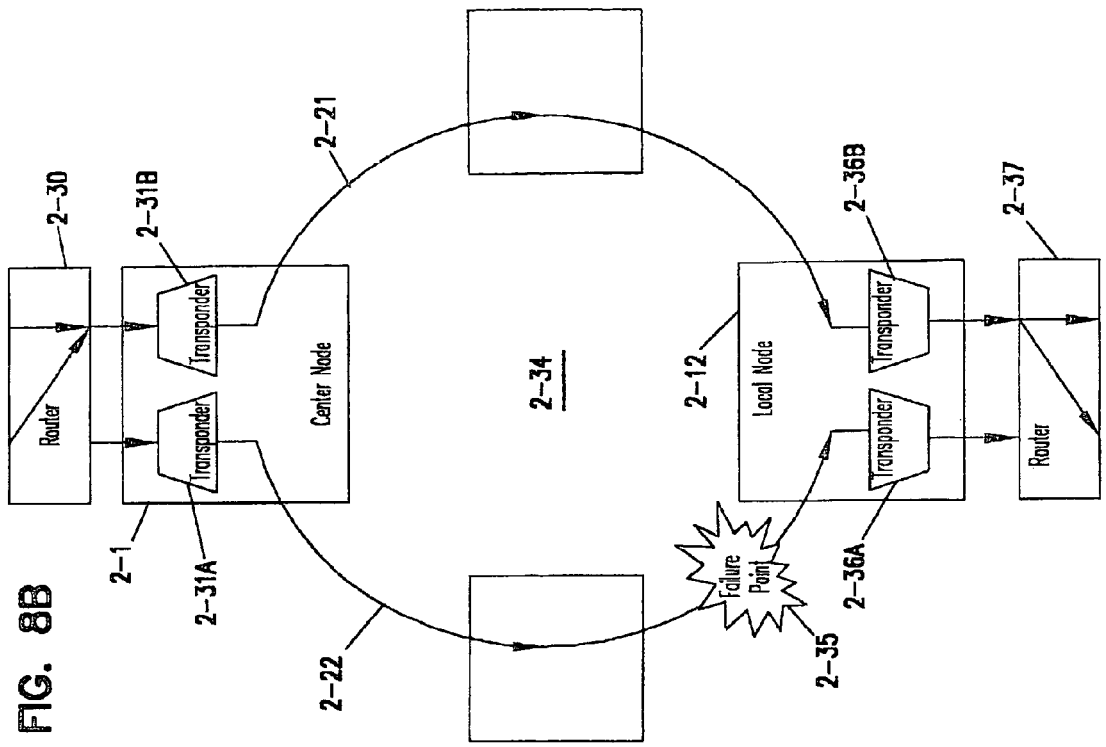
FIGS. 8A and 8B are diagrams illustrating traffic healing configuration with a failure in one of its two independent signal paths.
Figure 8B:
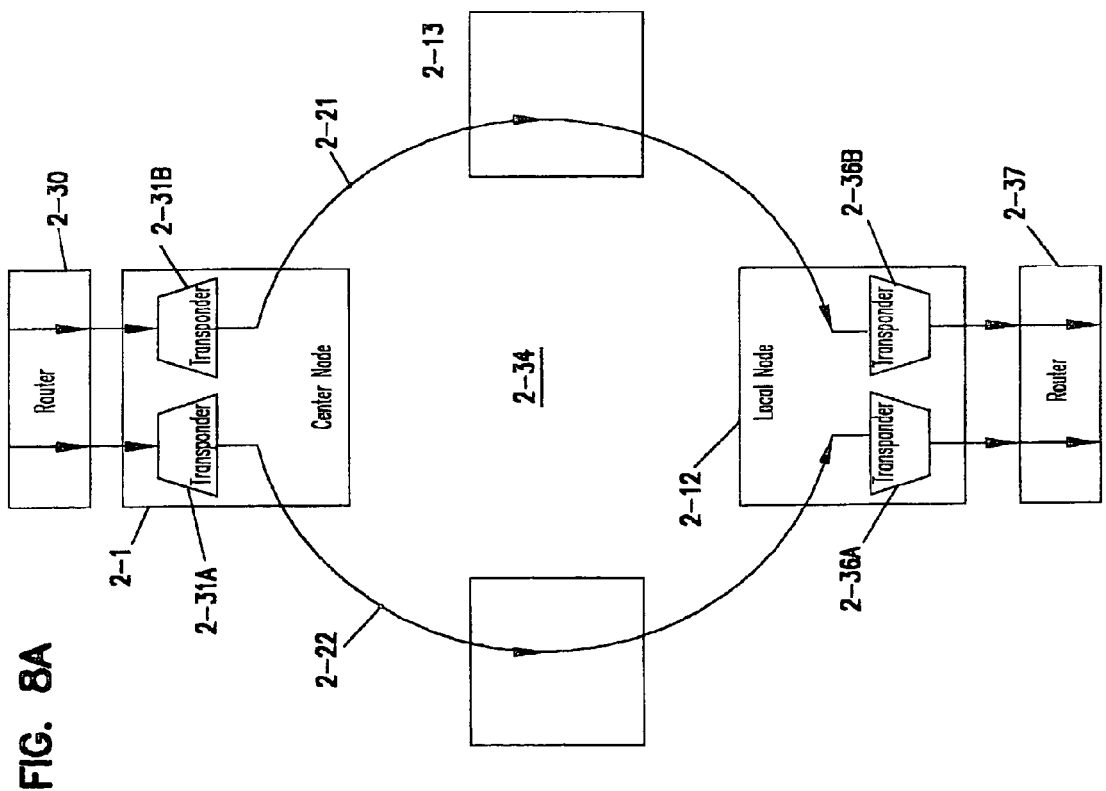

FIGS. 8A and 8B show a traffic healing configuration that enables operation to be restored when independent optical signals are connected in two different paths and a failure occurs in one of the paths. Rather than obtaining fault protection by using the optical divider 2-32 and optical switch 2-33, as described above in FIG. 3, between a transmit and receive nodes 2-1 and 2-12, the OADM system 2-34 of this configuration has two transponders 2-31A and 2-31B for two optical channels from a send router 2-30. The same two signals from two transponders 2-31A and 2-31B are routed through two independent paths 2-21 and 2-22 to two transponders 2-36A and 2-36B provided at the receive node 2-12, where they are received and processed by a router 2-37. In the normal or non-fault state, the independently transmitted signals provide high throughput as shown in FIG. 8A. When a failure occurs in one of the paths 2-35, loss of optical signal (LOS) is detected at the receive node 2-12 as shown in FIG. 8B. The LOS detect signal results in a fault alarm to the transmit node 2-1, which diverts the signals from the faulty side and overlays them in the good path 2-21 to restore service.

(8) Optical Network Example 8

Figure 9:
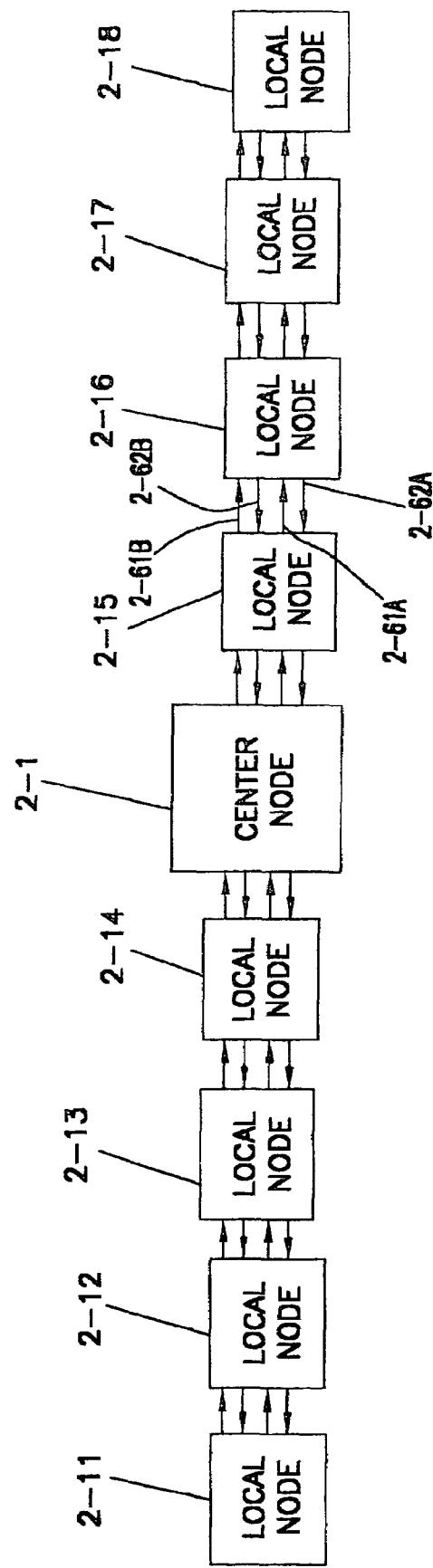
FIG. 9 illustrates a diagram illustrating a linear OADM network having linearly arranged geographic node locations.

FIG. 9 shows a linear OADM network featuring a geographic configuration in which the nodes are arranged in a linear fashion. The physical configuration includes rightward fiber paths 2-61A and 2-61B as well as leftward fiber paths 2-62A and 2-62B. Unlike ring configurations, this configuration provides no protect function using an optical divider 2-32 and optical switch 2-33, as described above with respect to FIG. 3. A logical star configuration for this network is implemented substantially the same as in Examples, 1, 4, 5, 6, and 7.

2. Nodes (1) Node Example 1

Figure 10:
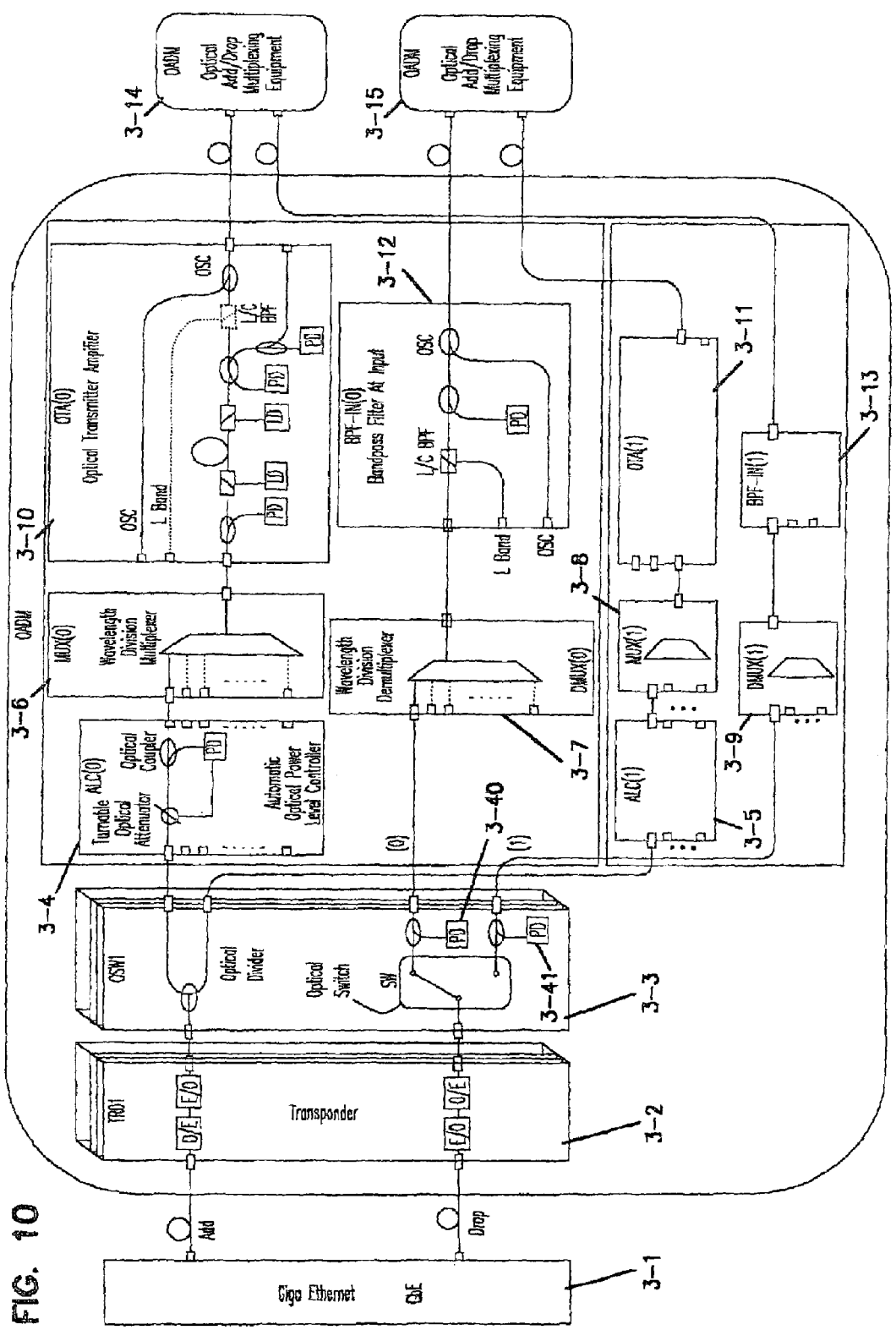
FIG. 10 is a diagram illustrating a main signal flow in center node of two-fiber UPSR network having optical add/drop multiplexers in a logical star configuration.

FIG. 10 shows the main signal flow in an OADM (optical add/drop multiplex) central node in a logical star two-fiber UPSR (unidirectional path switched ring) optical network.

The OADM system receives its main signal input from an external Gigabit Ethernet (GbE) interface unit. In the OADM system, the main signal or the add side signal in the first direction from the GbE unit 3-1 is input to a transponder 3-2, that wavelength-convert the input. The wavelength conversion process in transponder 3-2 temporarily converts the incoming signal from an optical signal to an electrical signal by an O/E converter. An E/O converter then converts this electrical signal to an optical signal having the wavelength of one of the channels of the wave-division multiplexed signal of the ring and outputs it. The signal thus output from the transponder 3-2 is split in two by an optical divider in the switch unit 3-3 and sent respectively to the automatic optical power level controllers 3-4 and 3-5 or ALC (0) and ALC (1). In the automatic optical power level controllers 3-4 and 3-5, the two signals are adjusted to a specific optical power level and sent respectively to the wavelength-division multiplexers 3-6 and 3-8 or MUX (0) and MUX (1). In the wavelength-division multiplexers 3-6 and 3-8, the add input wavelengths are multiplexed and transmitted. In the L-band optical transmitter/amplifiers 3-10 and 3-11 or OTA (0) and OTA (1); these multiplexed optical signals are amplified by an optical amplifier for transmission in the transmission path. Each of the L-band optical transmitter/amplifiers 3-10 and 3-11 has an optical insertion unit for inserting add-channel-wavelength-band optical signals and an optical insertion unit for inserting an OSC (optical supervisory channel) optical signal. The add-channel-wavelength-band optical signals are the band used for adding channels, or L-band in the example shown in FIG. 10.

The main signals in the second direction or the drop-side signals are received from the OADM units 3-14 and 3-15, which are respectively the nodes next to the present node in the 0-path and 1-path fiber rings. The drop-side signals are input respectively to the 0-path and 1-path input bandpass filters 3-12 and 3-13 or BPF-IN (0) and BPF-IN (1). Each of the input bandpass filters 3-12 and 3-13 has optical extraction means for extracting OSC signals and an optical extraction means for extracting add-channel-wavelength-band (L-band in the drawing) signals. In the wavelength-division demultiplexers 3-7 and 3-9 or DMUX (0) and DMUX (1), the incoming multiplexed signals are separated into their individual wavelength channel signals, which are fed to a (fixed channel switch) optical switch 3-3. Provided in the optical switch 3-3 is a switch SW for selecting signals input from the wave-division demultiplexers 3-7 and 3-9. Provided at the optical input terminations of the optical switch 3-3 whose inputs are from the demultiplexers 3-7 and 3-9, are LOS (loss of optical signal) detectors 3-40 and 3-41, for detecting faults and performing optical switching as required to restore service.

Figure 11:
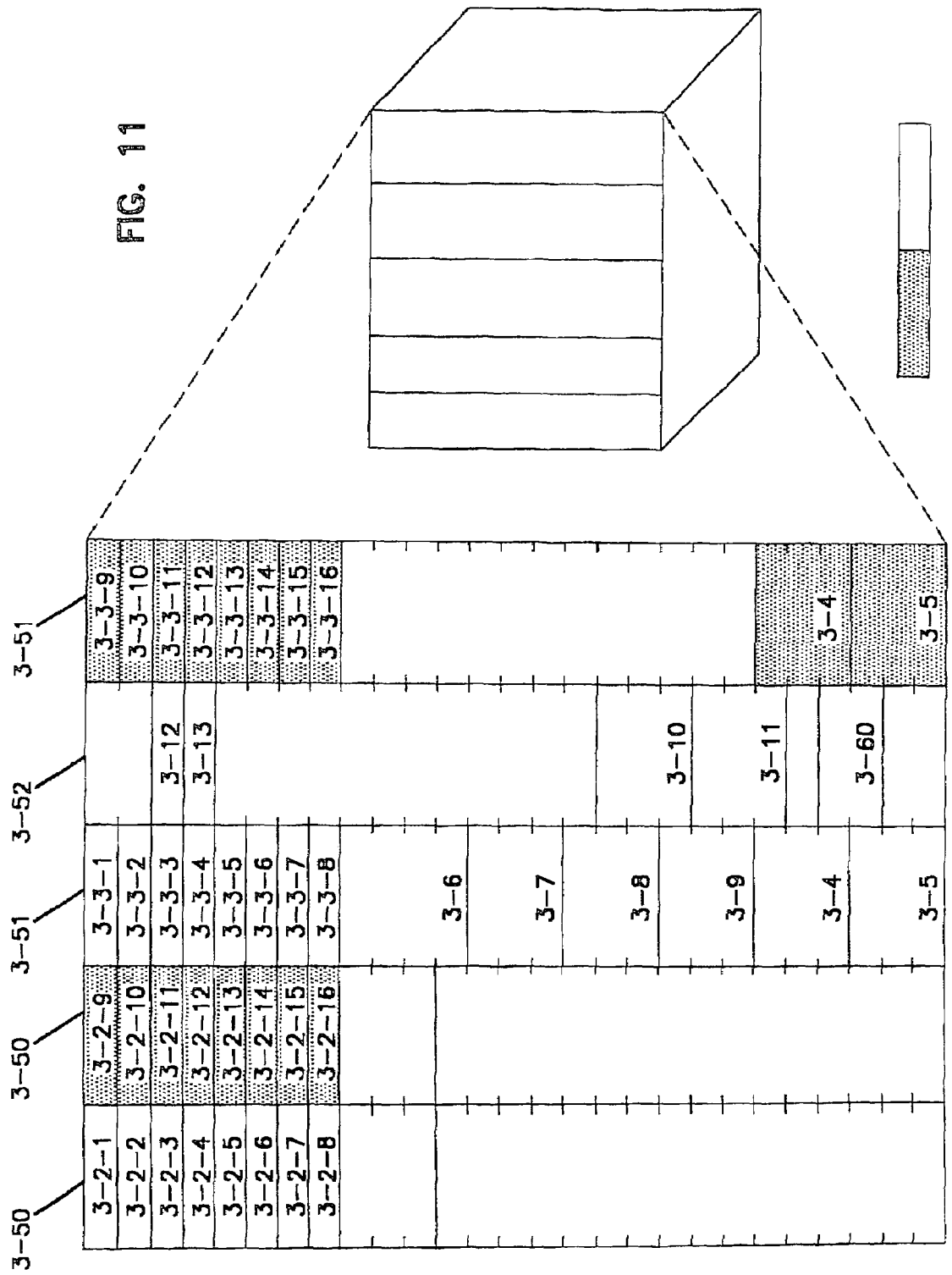
FIG. 11 is a diagram illustrating a rack configuration (1).

A rack-mounting configuration is shown in FIG. 11. The equipment required to be installed initially includes a transponder rack 3-50, an optical switch and wavelength-division multiplexer/demultiplexer rack 3-51, and an optical transmitter/amplifier rack 3-52. The units that are required initially to support eight channels include transponders 3-2-1 through 3-2-8, optical switches 3-3-1 through 3-3-8, '0' and '1' automatic optical power level controllers 3-4 and 3-5, '0' and '1' wavelength-division multiplexers 3-6 and 3-8, '0' and '1' wavelength-division demultiplexers 3-7 and 3-9, '0' and '1' L-band optical transmitter/amplifiers 3-10 and 3-11, and an OSC (optical supervisory channel) signal processor 3-60. Each of the units 3-2-1 through 3-2-8 and 3-3-1 through 3-3-8 supports one of eight different-wavelength channels. In addition, when it is desired to add channels, an additional transponder rack 3-50 and an optical channel wavelength multiplexer rack 3-51. By standardizing the add-on unit configuration, the number of different kinds of equipment is reduced, and that in turn reduces cost.

(2) Node Example 2

Figure 12:
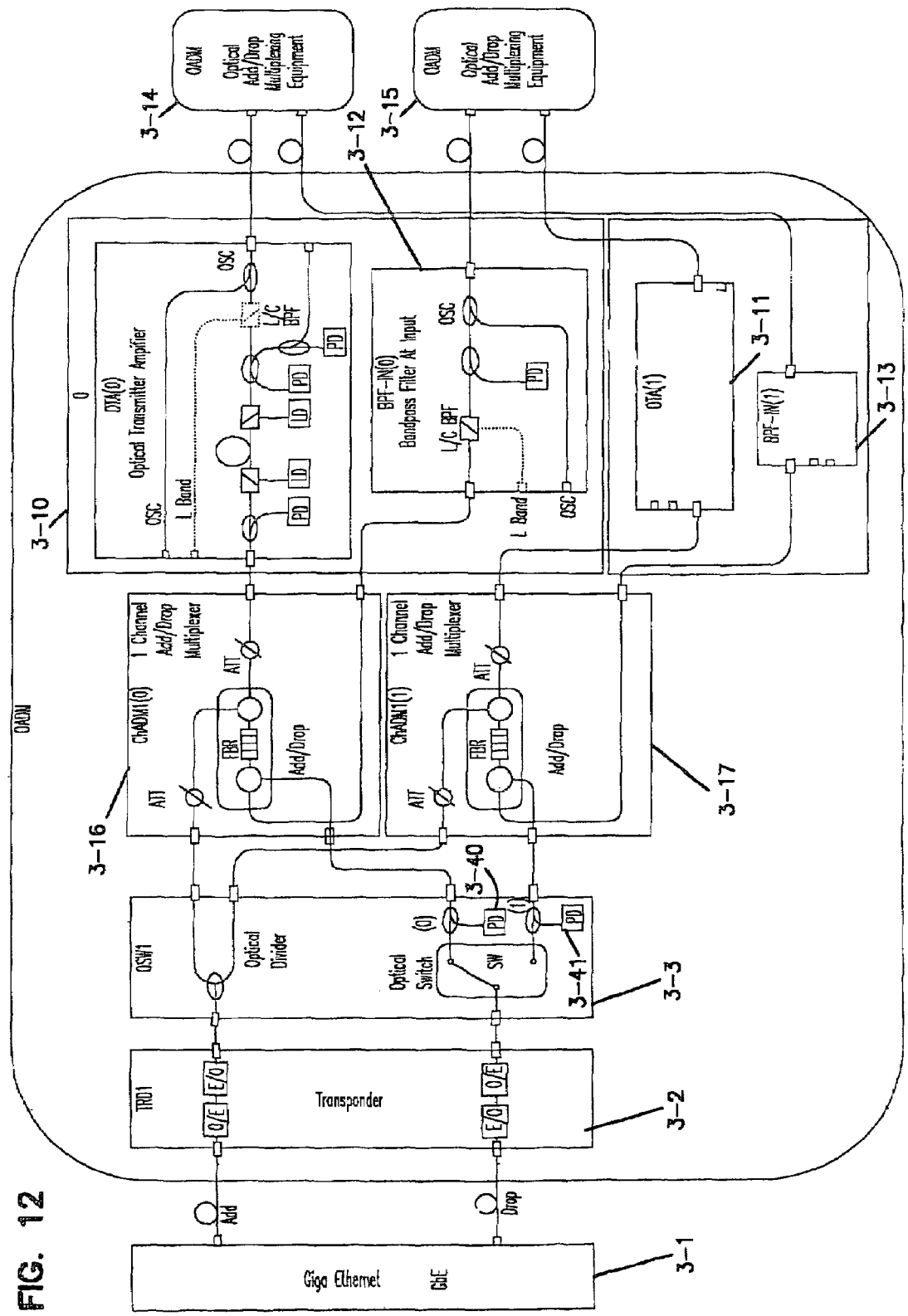
FIG. 12 is a diagram illustrating a main signal flow in local node of two-fiber UPSR network having optical add/drop multiplexers in a logical star configuration (1).
Figure 13:
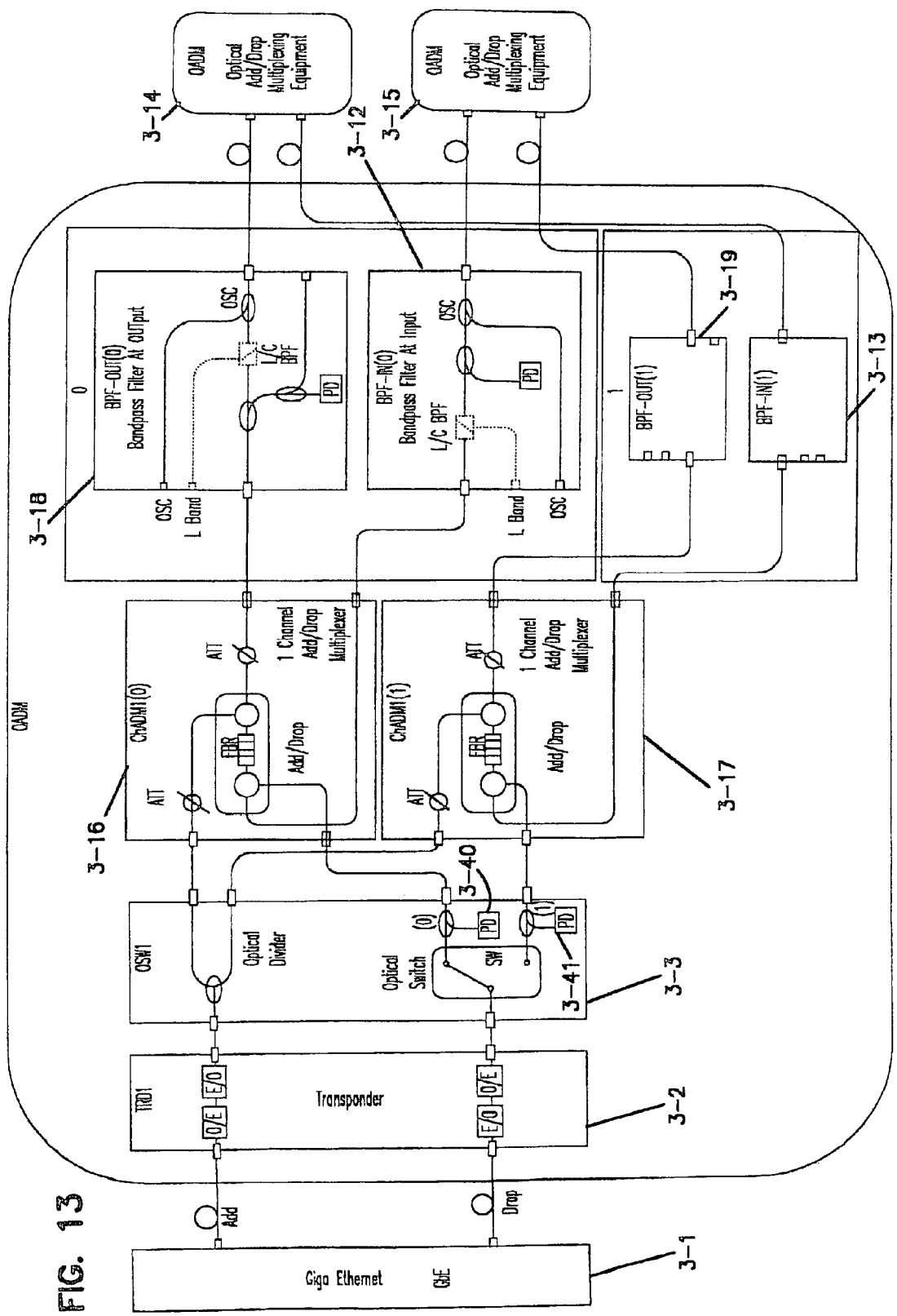
FIG. 13 is a diagram illustrating a main signal flow in local node of two-fiber UPSR network having optical add/drop multiplexers in a logical star configuration (2)

FIGS. 12 and 13 respectively show main signal flows (1) and (2) in an OADM local node in a logical star two-fiber UPSR optical network.

On the add side, the main signal from an external Gigabit Ethernet (GbE) interface unit 3-1 is fed to a transponder 3-2 in the OADM system. Transponder 3-2 performs wavelength conversion. In an optical switch 3-3, the OADM output is divided into a 0-path signal and a 1-path signal as an input to the channel add/drop units 3-16 and 3-17 or ChADM1 (0) and ChADM1 (1). In the add/drop units 3-16 and 3-17, the signals from the optical switch 3-3 are multiplexed with other channels and sent on to the L-band optical transmitter/amplifiers 3-10 and 3-11 or OTA (0) and OTA (1). If there is only a short distance between the present node and the OADM units 3-14 and 3-15 which are the nodes next to the present node in the 0-path and 1-path fiber rings, and the loss between these nodes is small, no optical amplifiers will be required at this point. In this case, the L-band optical transmitters 3-18 and 3-19 of FIG. 13, which have no amplifiers, are alternatively replaced with the L-band optical transmitter/amplifiers 3-10 and 3-11 of FIG. 12.

Still referring to FIG. 12, the main signals in the output direction (the drop-side signals) are received from the OADM units 3-14 and 3-15, which are respectively the nodes next to the present node in the 0-path and 1-path fiber rings, and are input respectively to the input bandpass filters 3-12 and 3-13 or BPF-IN (0) and BPF-IN (1). In each of two add/drop units 3-16 and 3-17, only one wavelength channel is extracted from the incoming multiplexed main signal and fed to a fixed channel switch-type optical switch 3-3. Provided in the optical switch 3-3 is a switch SW for selecting signals input from the add/drop units 3-16 and 3-17. The add/drop units 3-16 and 3-17 can be constructed from inexpensive dielectric filters and fiber Bragg reflectors. This provides a cost-effective configuration for nodes that require only a single channel add/drop capability.

(3) Node Example 3

Figure 14:
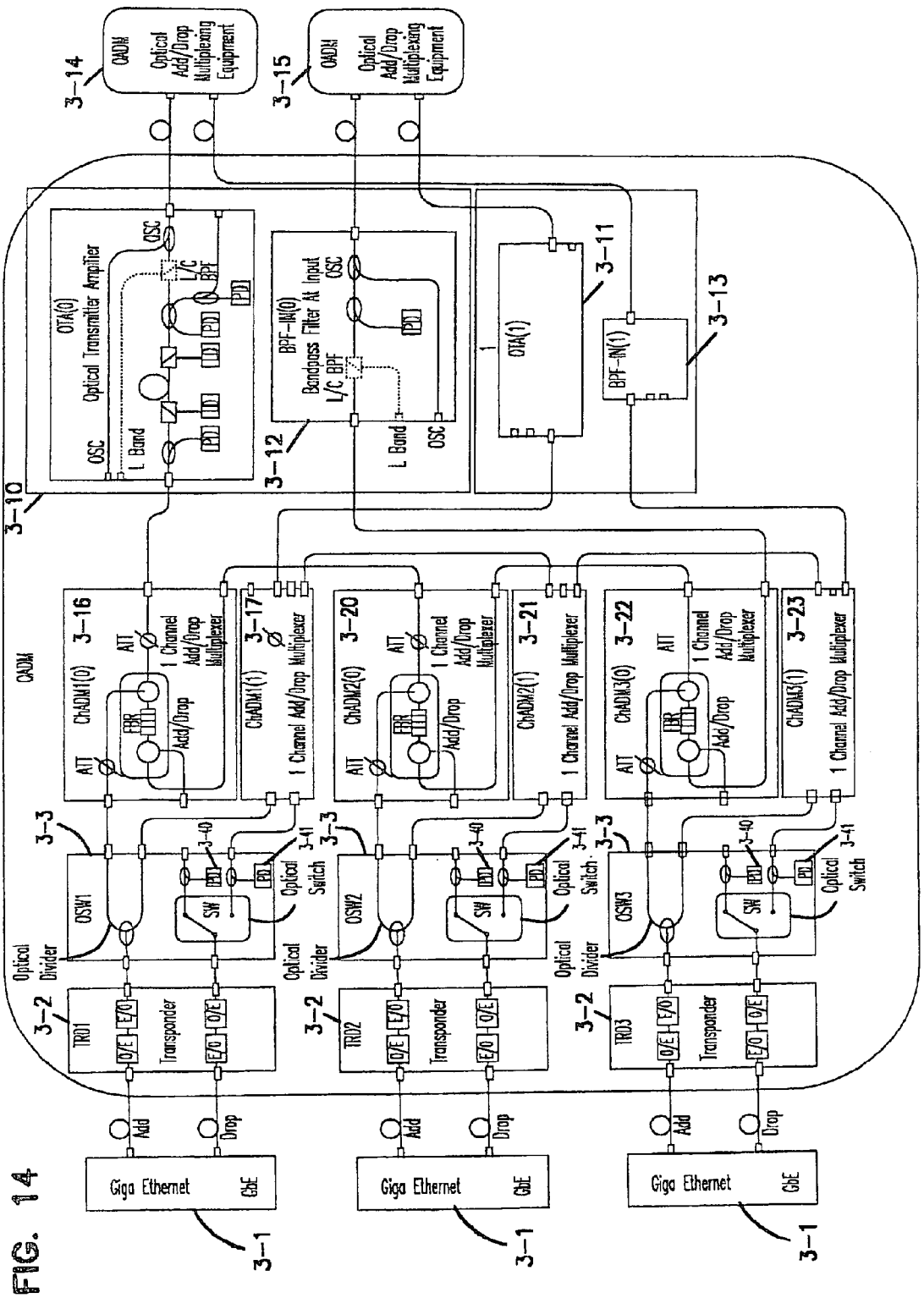
FIG. 14 is a diagram illustrating a main signal flow in local node of two-fiber UPSR network having optical add/drop multiplexers in a logical star configuration (1)
Figure 15:
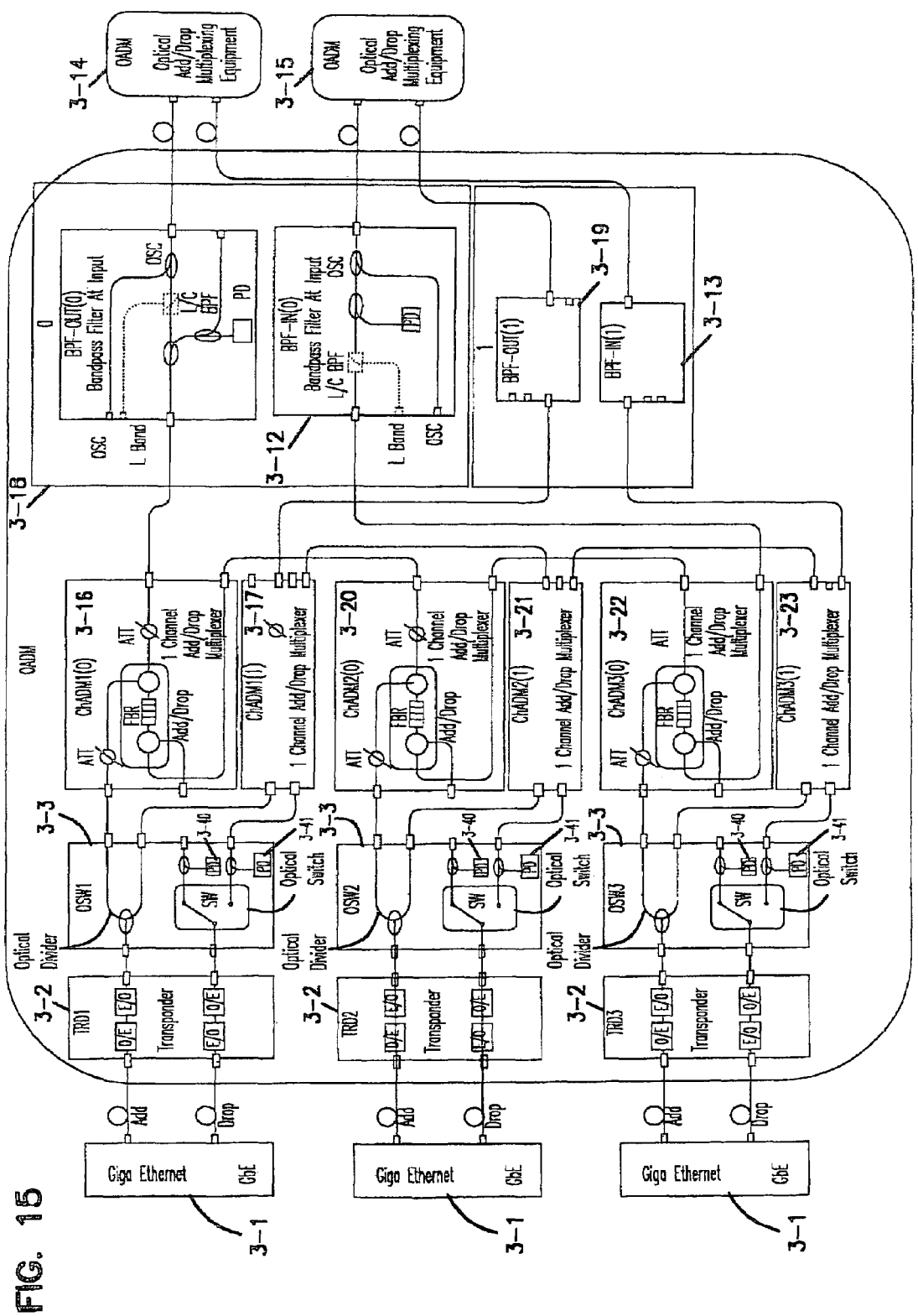
FIG. 15 is a diagram illustrating a main signal flow in local node of two-fiber UPSR network having optical add/drop multiplexers in a logical star configuration (2).

FIGS. 14 and 15 respectively show main signal flows (1) and (2) for an OADM local node in a logical star two-fiber UPSR optical network.

The basic configuration in this example is the same as that of Node Example 2 as shown in FIGS. 12 and 13, except for add/drop capability to add one to three channels. In addition to the add/drop units 3-16 and 3-17, this configuration also includes the second add channel add/drop units 3-20 and 3-21 respectively for the 0- and 1-paths and third add channel 0 and 1 add/drop units 3-22 and 3-23. As in Node Example 2, inexpensive dielectric filters and fiber Bragg reflectors are used in these additional add/drop units to provide a cost-effective configuration. If there is only a short distance between the present node and the OADM units 3-14 and 3-15 (the nodes next to the present node in the 0-path and 1-path fiber rings), and the loss between these nodes is small, no optical amplifiers will be required at this point. In this case, the L-band optical transmitters 3-18 and 3-19 of FIG. 15, which have no amplifiers, can be substituted for the L-band optical transmitter/amplifiers 3-10 and 3-11 of FIG. 14.

Figure 16:
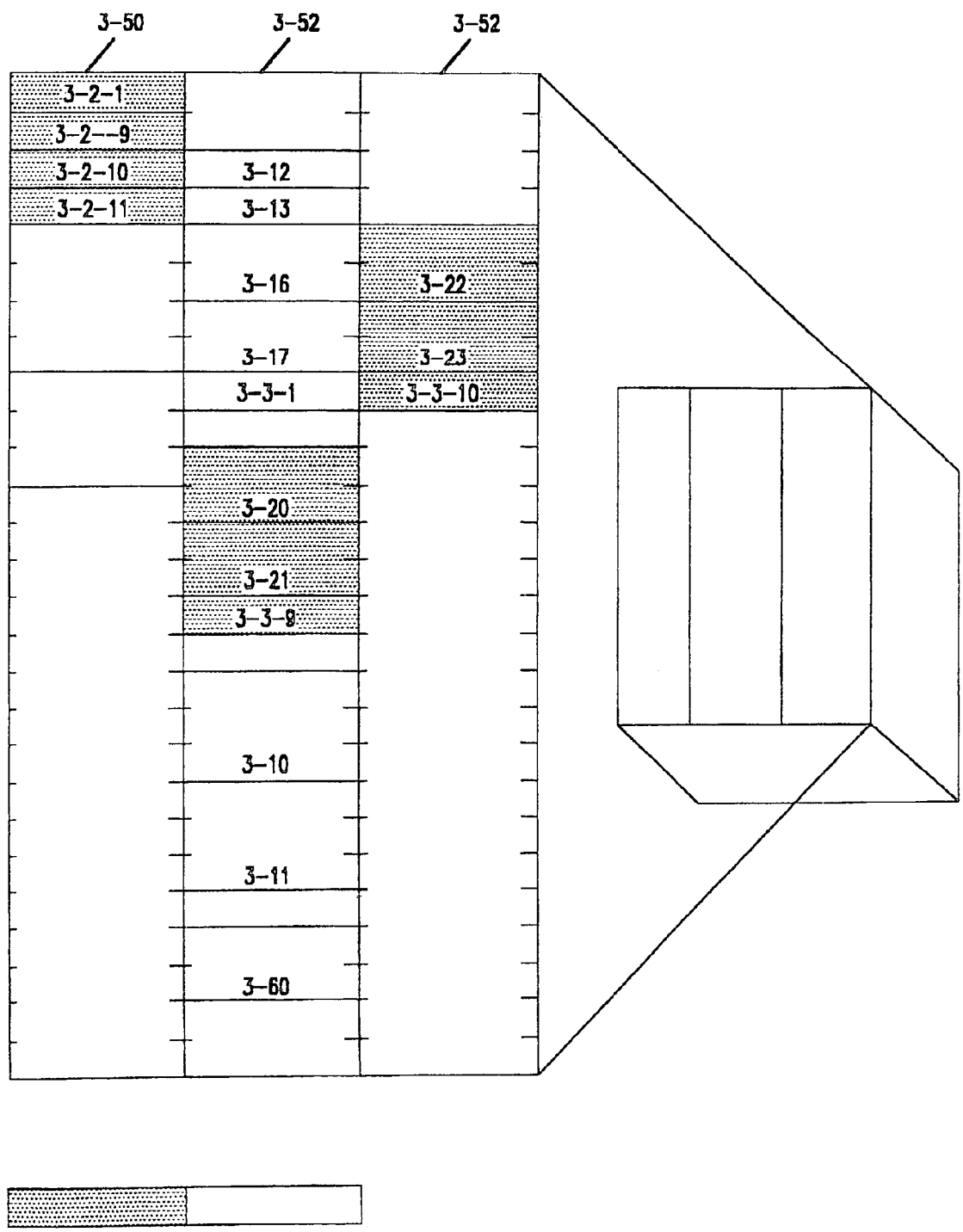
FIG. 16 is a diagram illustrating a rack configuration (2).

A second rack-mounting configuration is shown in FIG. 16. The equipment required to be installed initially includes a transponder rack 3-50, which includes an optical switch, wavelength-division multiplexer/demultiplexer and a transponder 3-2-1. '0' and '1' add/drop units 3-16 and 3-17, '0' and '1' L-band optical transmitter amplifiers 3-10 and 3-11, and an OSC (optical supervisory channel) signal processor 3-60 are mounted on an optical amplifier rack 3-52. Second add channel add/drop units 3-20 and 3-21 respectively for the 0- and 1-paths and third add channel add/drop units 3-22 and 3-23 are added as required. In particular, when a third add-channel capability is provided, an additional optical switch/wavelength-division multiplexer/demultiplexer and optical amplifier rack 3-52 is required. Since common equipment types are used here and in the center node rack configuration shown in FIG. 11, cost advantages are realized in terms of parts availability, and reduced maintenance spares inventory.

(4) Node Example 4

Figure 17:
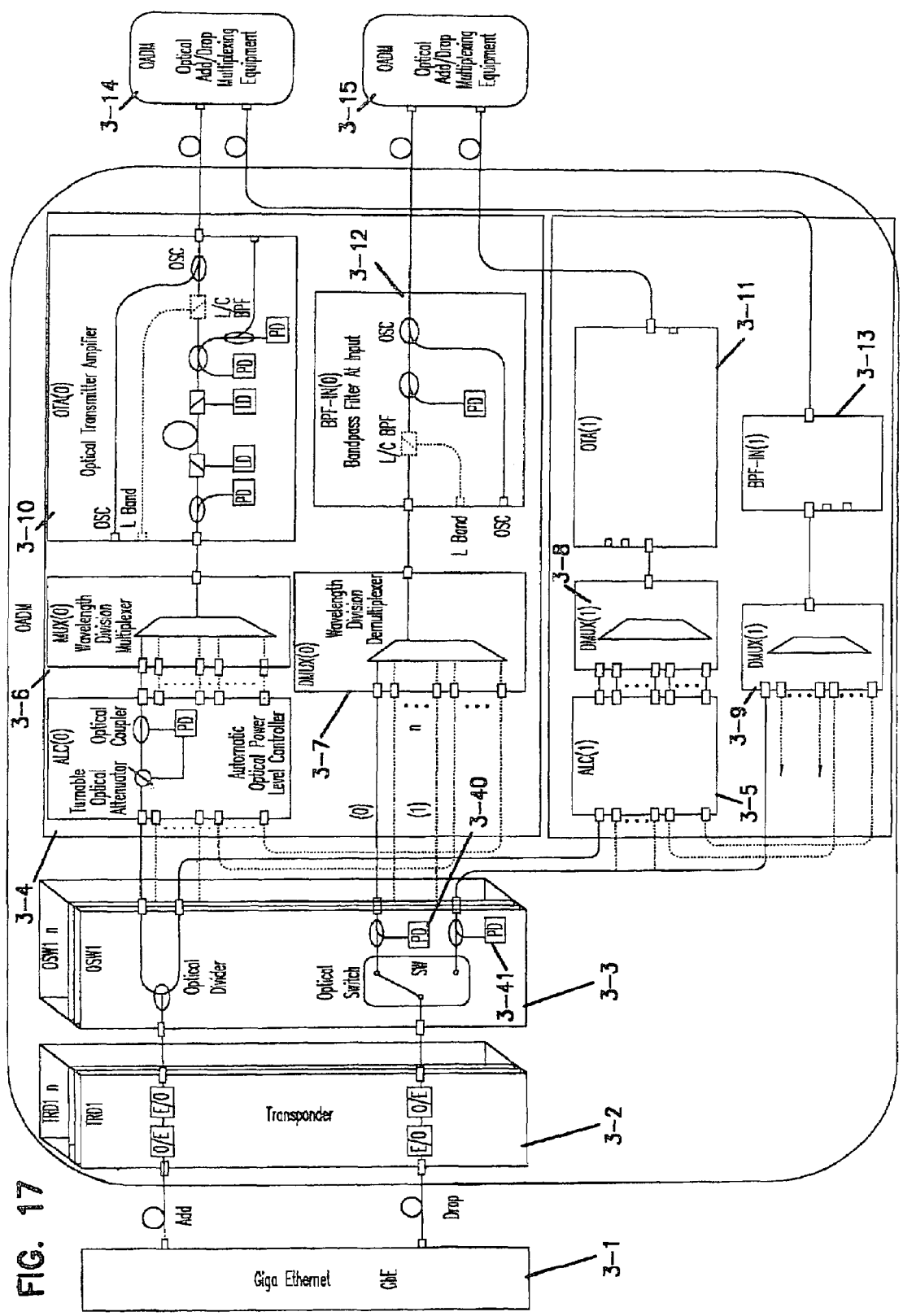
FIG. 17 is a diagram illustrating a main signal flow in local node of two-fiber UPSR network having optical add/drop multiplexers in a logical star configuration (1).
Figure 18:
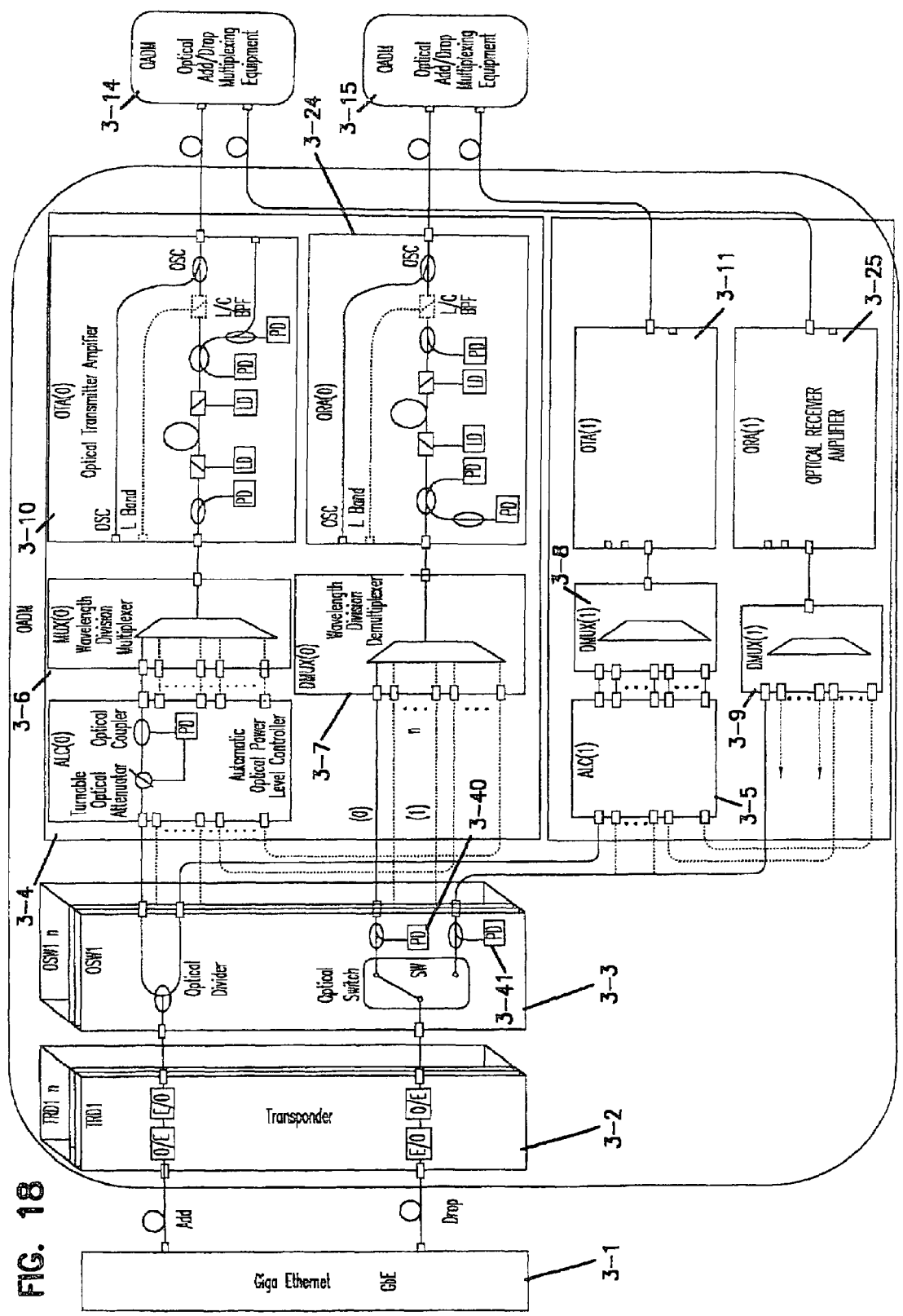
FIG. 18 is a diagram illustrating a main signal flow in local node of two-fiber UPSR network having optical add/drop multiplexers in a logical star configuration (2).

FIGS. 17 and 18 respectively show main signal flows (1) and (2) for an OADM local node in a logical star two-fiber UPSR optical network.

The main signal flow configuration of this example is essentially the same as that of Node Example 1. However, since it is not necessary for this node to have add/drop capability for all channels, as is required in the logical star-type center node of Node Example 1, although additions are made in the future, in the interim, for the unused channels, a direct optical fiber connection is used from the wavelength-division demultiplexers 3-7 and 3-9 to the automatic optical power level controllers 3-4 and 3-5.

If there is a long distance between the present node and the OADM units 3-14 and 3-15 in respectively the 0-path and 1-path fiber rings, and the transmission path loss between these nodes is therefore large, optical amplifiers will be required at the inputs of these nodes. In this case, the L-band optical receiver/amplifiers 3-24 and 3-25 of FIG. 18 are alternatively substituted for the 0-path and 1-path input bandpass filters 3-12 and 3-13 of FIG. 17.

(5) Node Example 5

Figure 19:
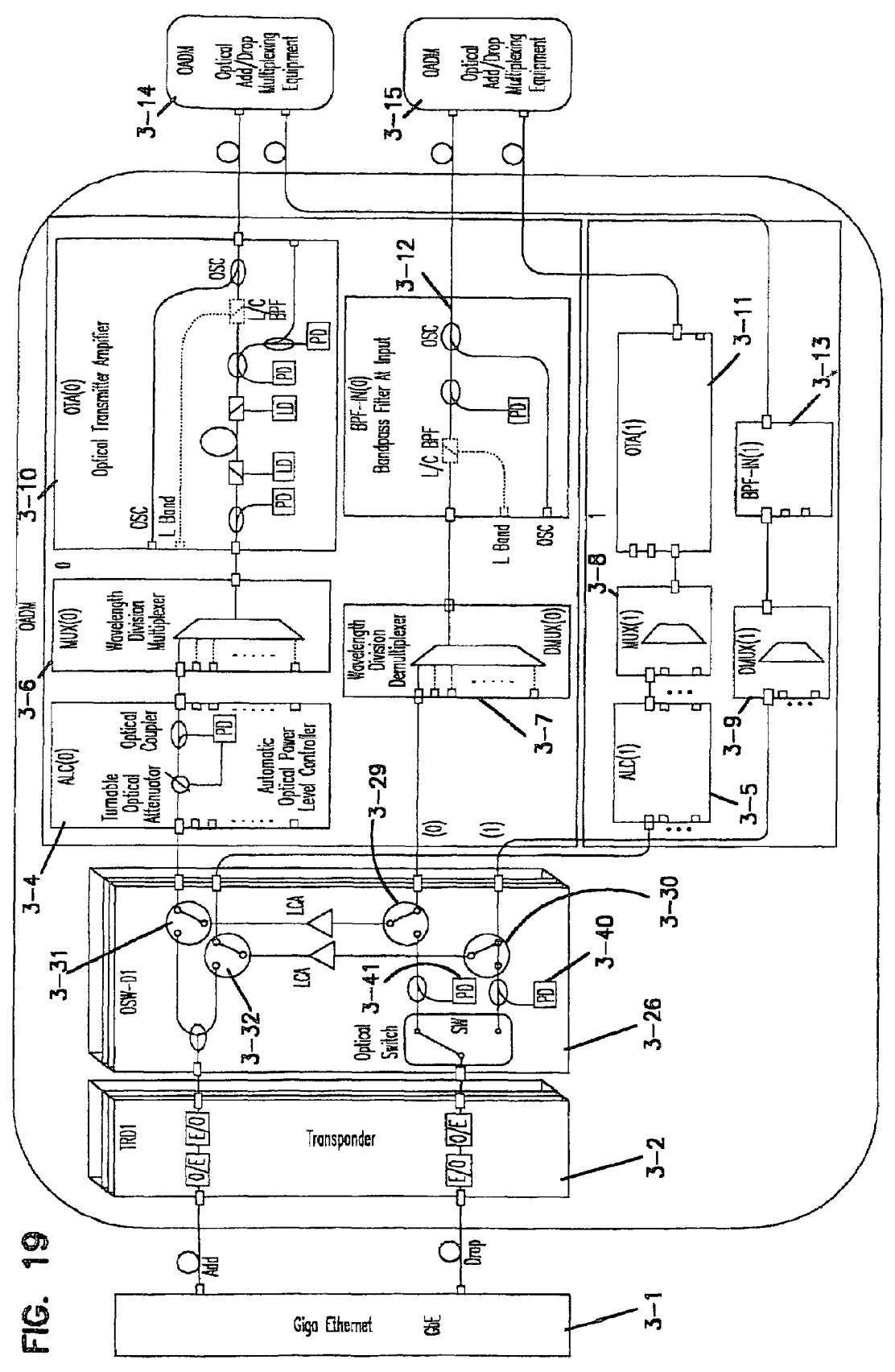
Figure 20:
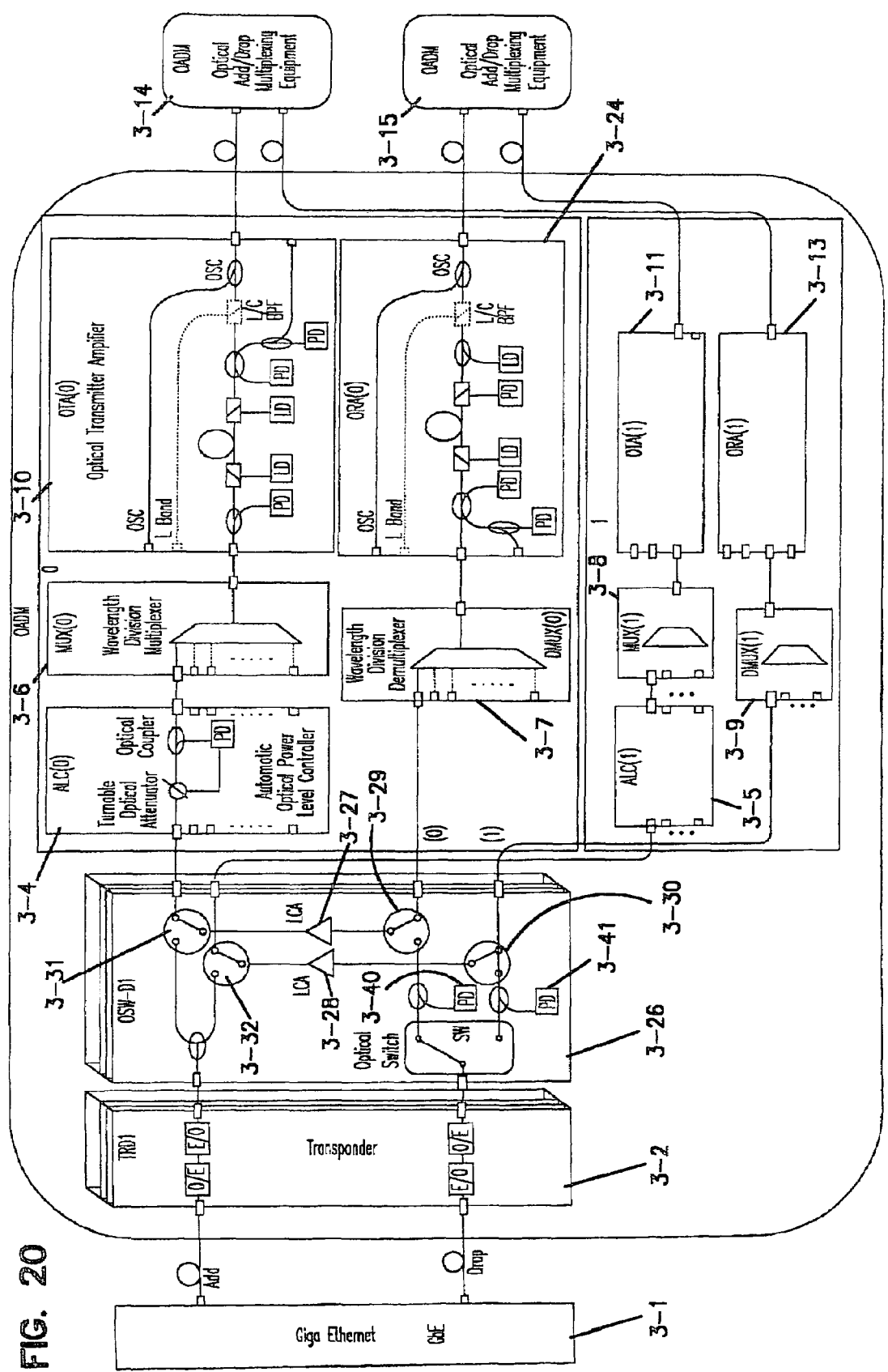
FIG. 20 is a diagram illustrating a main signal flow in main node of two-fiber UPSR network having optical add/drop multiplexers (2).

FIGS. 19 and 20 respectively show main signal flows (1) and (2) for an OADM center node in a two-fiber UPSR optical network. This configuration differs from that of Node Example 1 in that a dynamically switchable configuration is used in optical switch 3-26. In this configuration, rather than being dropped to the transponder 3-2, the main signals input to this node from the ring network are looped-back by the drop/through select optical switches 3-29 and 3-30 and add/through select optical switches 3-31 and 3-32 for transmission back into the ring. When this through-route is selected, the additional optical power loss caused by these switches is a problem. Referring FIG. 20, loss compensation amplifiers (LCA) 3-27 and 3-28 are therefore respectively provided in the 0- and 1-paths to compensate for this loss. This configuration absorbs optical power level variations due to switching.

Also, other functions are added by simply substituting optical switches 3-26 for the optical switches 3-3 of Node Examples 1 through 4. Since the different channels are all set to the same power levels, different components and adjustment values are used together. This enables 'in-service expansion' in which optical channels having the other functions are added with the remaining channels maintained in a usable state.

Figure 21:
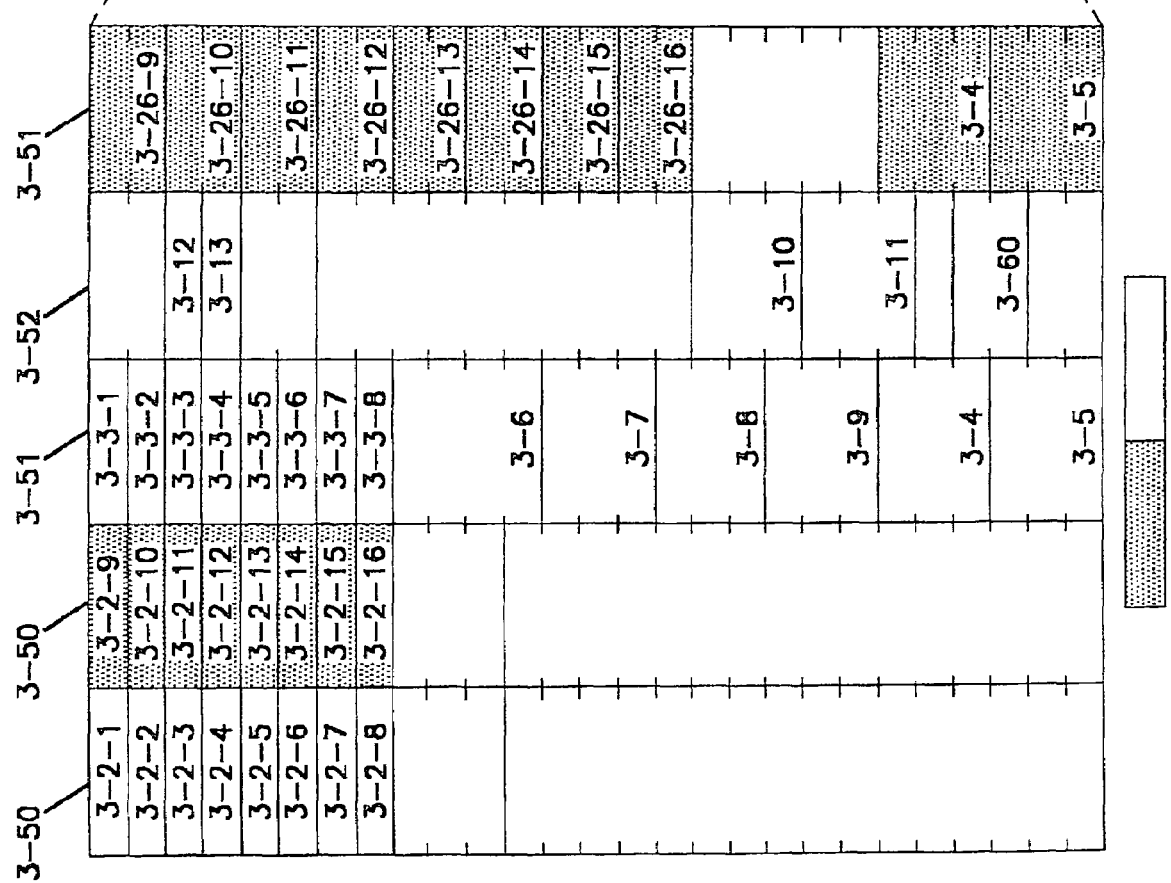
FIG. 21 is a diagram illustrating a rack configuration for main node with add/drop optical switches.
Figure 22:
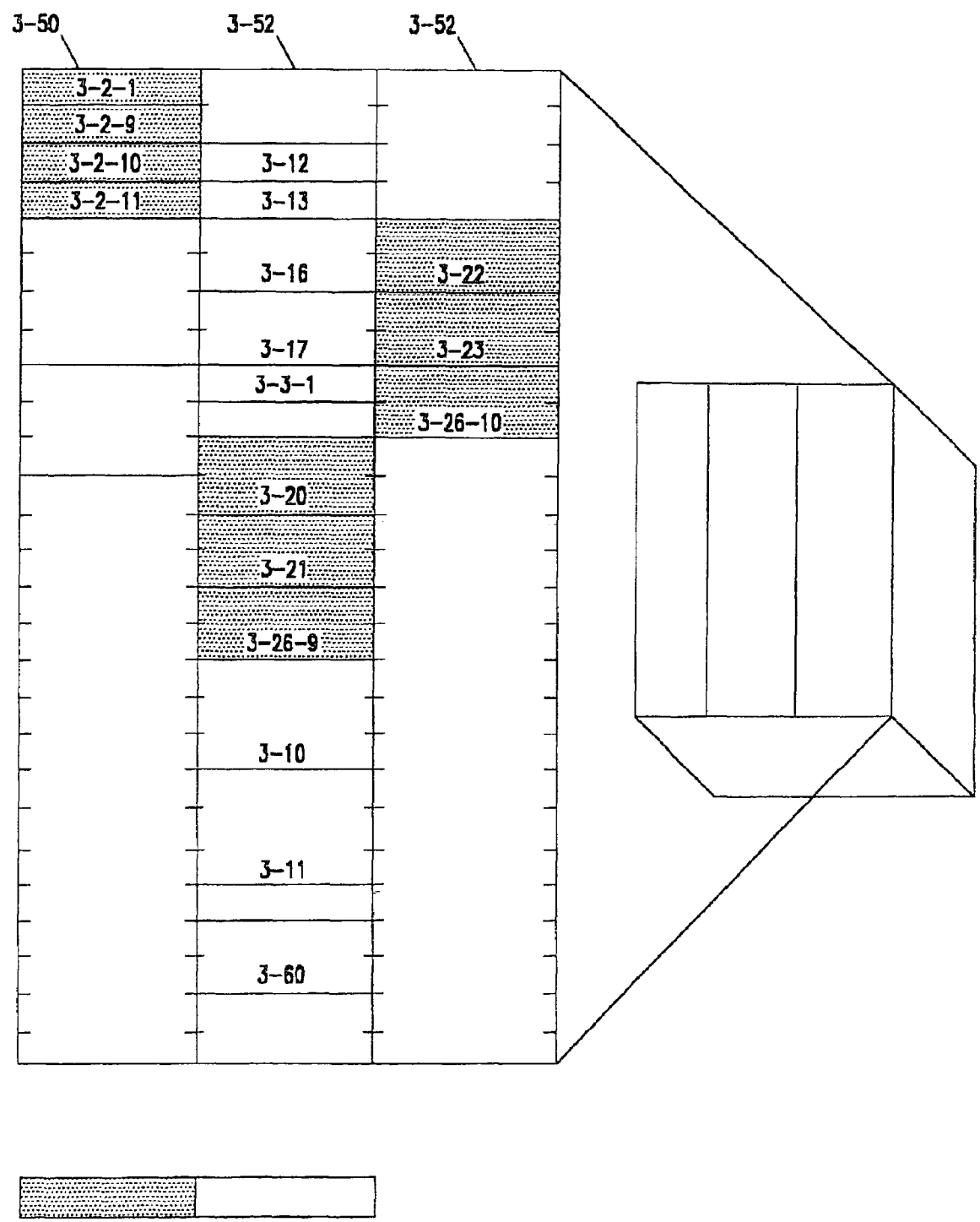
FIG. 22 is a diagram illustrating a rack configuration for local node with add/drop optical switches.

FIG. 21 shows a rack mounting diagram for a central node having an add/drop optical switch while FIG. 22 shows the rack layout for a corresponding local node. In both of these racks, the cables and connectors are provided to support the addition of either standard optical switches 3-3 or add/drop/through optical switches 3-26-9 through 3-26-16. This allows add/drop/through switches to be used, as needed, in conjunction with the regular switches, to provide functional expansion of service.

(6) Node Example 6

Figure 23:
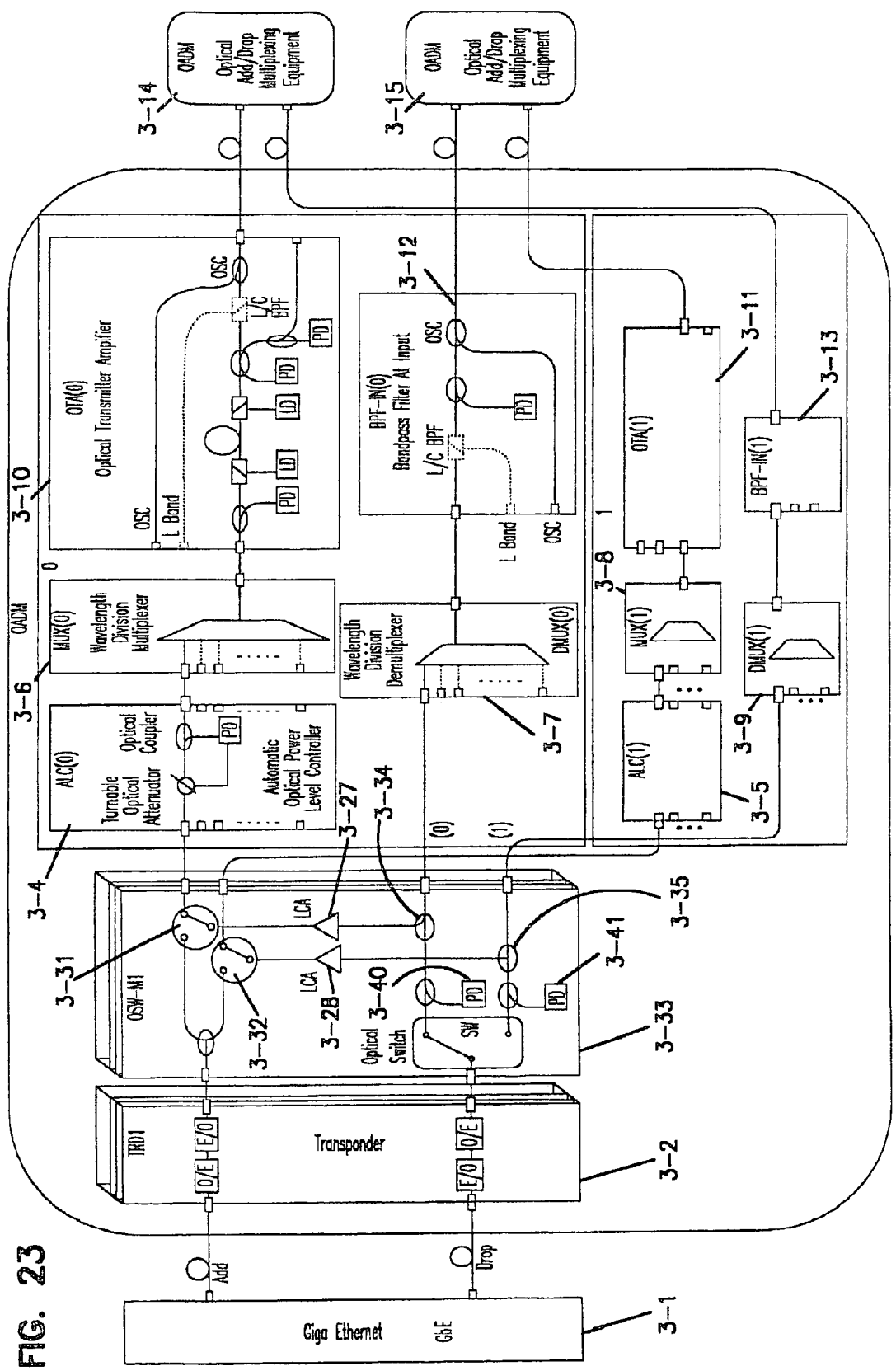
FIG. 23 is a diagram illustrating a main signal flow in main node of two-fiber UPSR network having optical add/drop multiplexers (1).
Figure 24:
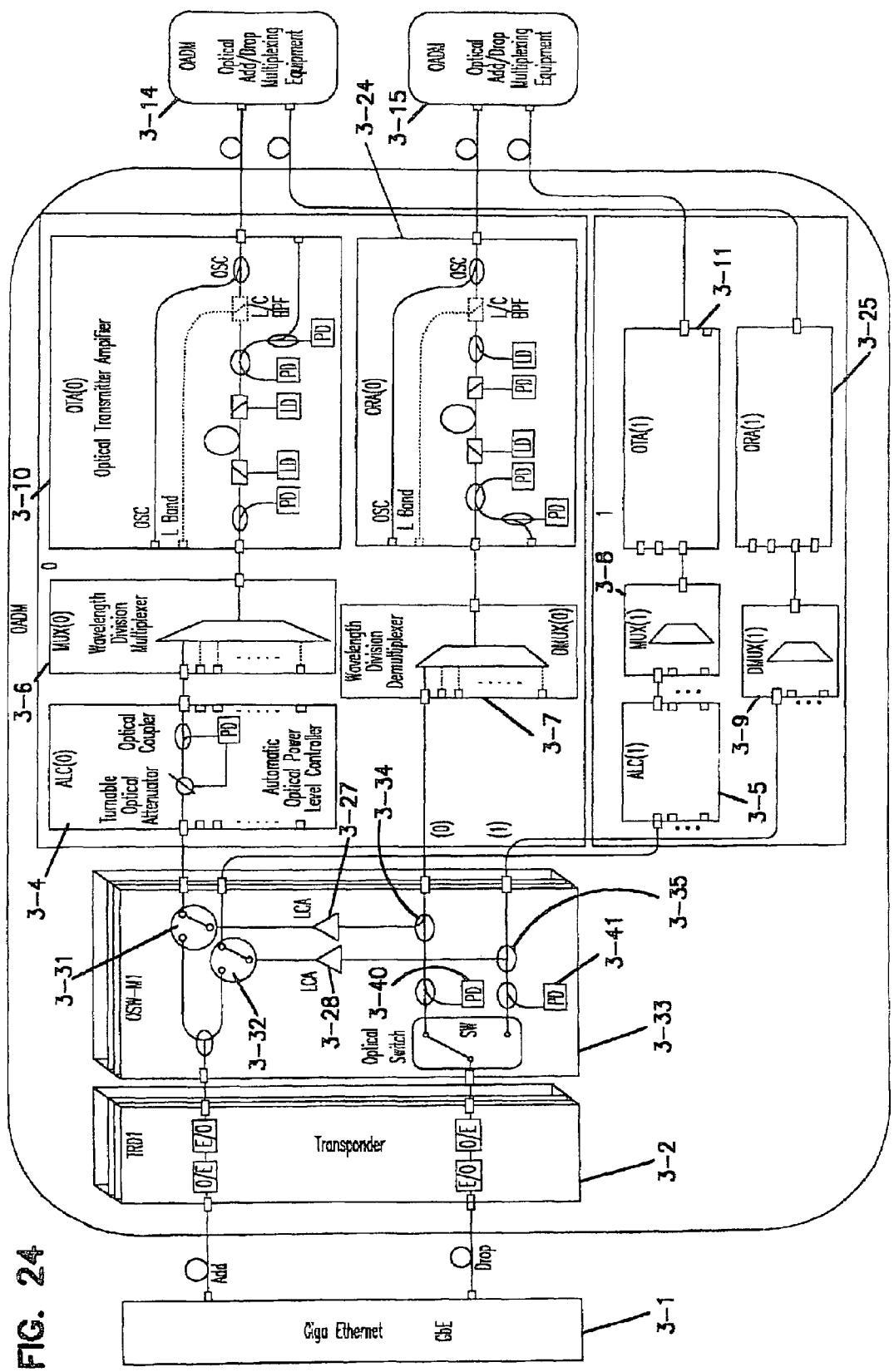
FIG. 24 is a diagram illustrating a main signal flow in main node of two-fiber UPSR network having optical add/drop multiplexers (2).

FIGS. 23 and 24 respectively show main signal flows (1) and (2) for an OADM center node in a two-fiber UPSR optical network. This configuration differs from that of Node Example 1 in that in the optical switch 3-33 of this configuration, the main signals input from the ring are divided and fed into two routes. One route drops the signal to the transponder 3-2, and another route returns it to the ring. The signal division is performed by drop/through couplers 3-34 in the 0-path and 3-35 in the 1-path. As in Node Example 5, additional optical power loss is contributed by the additional switch in the through-route. Loss compensation amplifiers (LCA) 3-27 and 3-28 are therefore respectively used in the 0- and 1-paths to compensate for this loss.

Other functions are optionally added by simply substituting optical switches 3-26 for the optical switches 3-3 of Node Examples 1 through 4. Since the different channels all are set to the same power levels, different components and adjustment values are used together. This enables 'in-service expansion' in which optical channels having the other functions are added with the remaining channels maintained in a usable state.

As in Node Examples 4 and 5, FIG. 23 shows an example of the main signal flow with no optical amplifier on the receive side while FIG. 24 shows the main signal flow with an optical receiver/amplifier 3-25 on the receive side.

3. Optical Fiber and Wavelength Band Range (1) Dispersion-shifted Optical Fiber

Described in this example is a C-band wavelength-division multiplex system implementation using dispersion-shifted optical fiber (DSF) transmission paths in which dispersion approaches zero for wavelengths near 1550 nm (fiber in accordance with ITU-T G.653, DSF). When a C-band or WDM carrier having equally-spaced wavelengths is transmitted at normal light levels in a dispersion-shifted fiber transmission path at a wavelength for which dispersion is near zero, four-wave mixing occurs. A good supply of inexpensive C-band optical components is already available on the market. For example, the normal light level conditions include −5 to 0 dBm for 1430 nm-1580 nm light in accordance with STM16 of ITU-T G.957. The 1570 nm-1600 nm wavelength band is referred to as L-band. When this band is used in the DSF transmission paths equally-spaced wavelength placements are possible for which dispersion becomes zero and disappears. This has given rise to ideas for the use of L-band. Components for this band, however, are in short supply and expensive.

Presented in this example is technology for using C-band wave-division multiplexers in dispersion-shifted fiber transmission paths. Four-wave mixing is a phenomenon that occurs when equally spaced wavelength signal levels exceed −3.5 dBm per optical channel. Because prior technology was directed toward high data transition rates such as 2.5 Gbit/s and 10 Gbit/s at an optical output of −3.5 dBm, it was not possible to obtain adequate differences with respect to the minimum receive sensitivities based on noise constraints. Thus transmission over practical distances was not possible. For example, with a PIN photodiode used as a detector, the minimum receive sensitivity was −18 dBm at 2.5 Gbit/s and −14 dBm at 10 Gbit/s. There were problems in terms of optical SNR (signal to noise ratio) constraints as well. For a path having seven repeater optical amplifiers with NF (noise figure) of 7 dB, the minimum receive sensitivity was −24 dBm at 2.5 Gbit/s and −18 dBm at 10 Gbit/s. Also, the best value that could be achieved for maximum path loss in the fiber transmission path with compensation is 14 dB at 2.5 Gbit/s, 8 dB at 10 Gbit/s, 10-14 dB at 2.5 Gbit/s and 4-8 dB at 10 Gbit/s with tolerances applied. This made it difficult to find practical applications for this technology.

The Gigabit Ethernet data transmission rate is 1.25 Gbit/s. At this data rate, the SNR is 3 dB better than that at 2.5 Gbit/s, which enables a compensated optical fiber transmission path loss of 12 dB. Thus with margin, this makes a C-band 20-40 km optical fiber transmission path possible. The same transmission is difficult to do at 10 Gbit/s) possible.

The present example is a method for transmitting a 1.25 Gbit/s data rate optical signal in a DSF optical fiber transmission network with seven repeater nodes separated by 20-40 km spans, in which the four-wave mixing that characteristically occurs in DSF at C-band is avoided by reducing optical power levels. With the span loss is on the order of 12 dB, one optical amplifier repeater stage at each node either as a preamp or a postamp is sufficient. The function of the repeater optical amplifier at each node is to amplify optical channel signals passing through the node, but optical channel signals dropped at that node must also be accounted for. Because reducing optical signal levels could result in insufficient input to optical receivers, in the present example, optical preamplifiers are used to ensure adequate levels at the inputs to optical receivers. If the required output level of the node ranged from −14 to −3.5 dBm, the span loss would be 12 dB, and the transmission path penalty would be 1 dB. The minimum optical receive level at the node input would be −27 dBm. This level is amplified by the optical preamplifier to −20 dBm at the receiver input so as to provide a margin of 10 dB with respect to an optical receiver unit receive level of −30 dBm.

(2) Normal Dispersion Optical Fiber

In this example; C-band wavelength-division multiplex system implementation is described using a normal-dispersion optical fiber transmission path in which dispersion approaches zero for wavelengths near 1310 nm in accordance with ITU-T G.652, SMF. Unlike in a dispersion-shifted transmission path, because there is dispersion on the order of 17 ps/nm/km at wavelengths near 1550 nm, a C-band multiplex carrier with equally spaced wavelength channels is transmitted with no concern for four-wave mixing regardless of the optical signal level. An abundant supply of inexpensive C-band optical components is already available on the market. For the system of the present example, a span length of 20-40 km was assumed with span loss of approximately 12 dB. Because an adequate SNR margin is provided by using high optical power levels, up to 16 nodes are included, and with signal conversion the configuration is expanded up to 15 optical repeater nodes. With a span loss range of approximately 12 dB, a single optical pre or a post amplifier at each repeater node is enough. The function of the repeater optical amplifier at each node is to amplify optical channels passing through the node. Since the number of necessary amplifiers corresponds to the number of nodes, this is an area in which it would be desirable to control costs. In direct contrast to the DSF above discussed example, in which optical receiver constraints were a concern, at high optical levels, it is the constraints on output level at the transmit end. In general, optical transmitters become substantially more difficult to manufacture and thus are substantially more expensive when they are made for optical output levels of 0 dBm or more. Between the optical transmitter and the node output, the signal passes through a multiplexer, ALC, and demultiplexer units, and the signal encounters approximately 9 dB of loss. For this reason, postamplifiers rather than preamplifiers are used. If the overall optical level is high, the levels applied to the receivers of the nodes will also be high, and preamplifiers will not be required.

Figure 25:
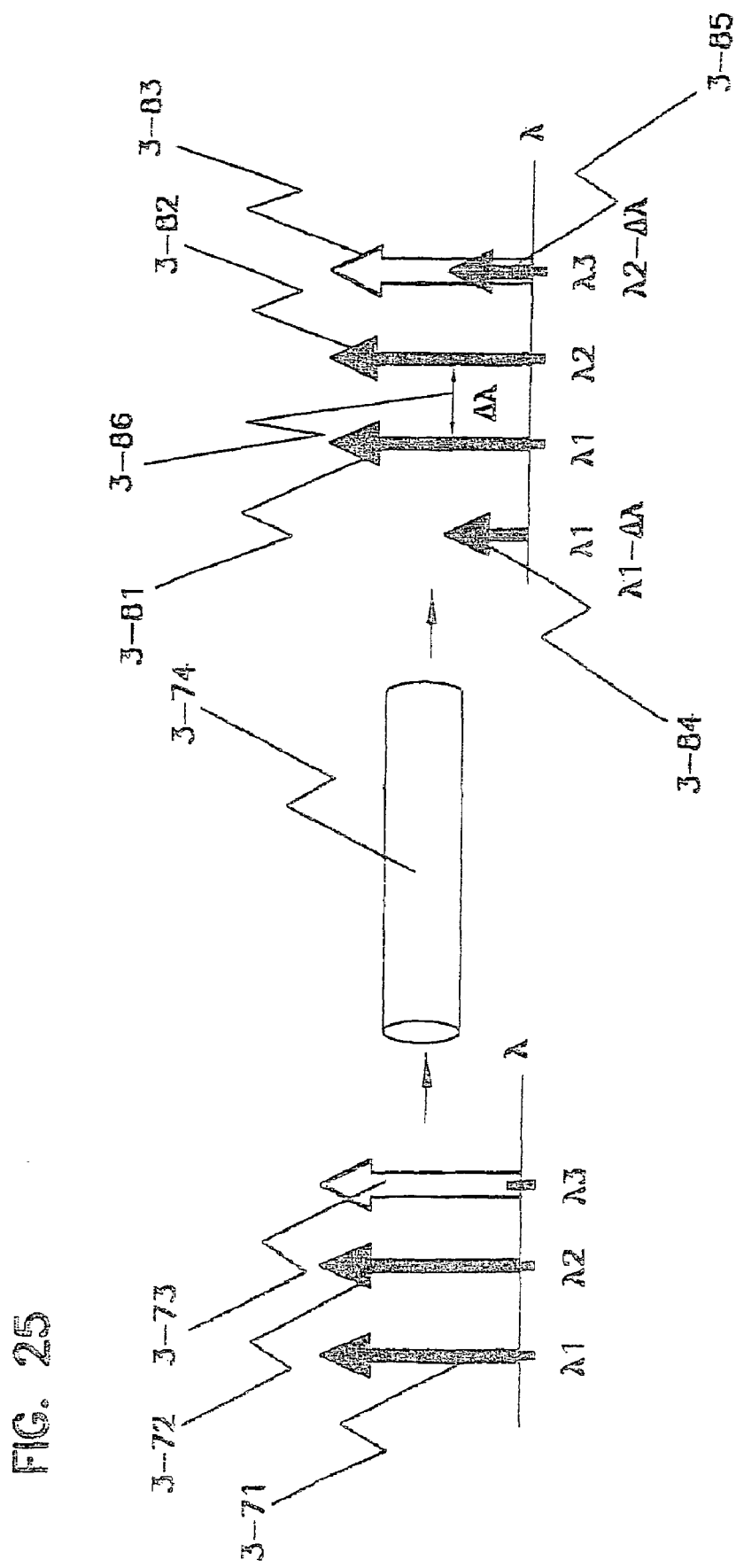
FIG. 25 is a diagram illustrating the C-band multiplex wavelength transmitting system.

4. An Optical fiber and a Wave Length Range (1) A Dispersion Shifted Optical Fiber Referring to FIG. 25, an embodiment of a C-band multiplex wave length transmitting system to a dispersion shifted optical fiber (stipulated in the ITU-T G.653, DSF) transmitting path with a wave length in the vicinity of 1550 nm shows a chromatic dispersion. FIG. 25 shows a four wave mixing phenomenon when optical signals of the C-band which are at equal spacings are transmitted to a DSF transmitting path. In the dispersion shifted optical fiber (DSF) transmitting path 3-74, when optical signals of a wave length of the C-band which show a substantially zero chromatic dispersion are arranged at equal wave length spacings as follows: when λ1=optical signal 3-71, λ2=optical signal 3-72, and λ3=optical signal 3-73, are input, the four wave mixing phenomenon is caused, resulting in an output of wave length λ1−Δλ=optical signal element 3-84 and wave length λ2+Δλ=optical signal element 3-85 as a four wave mixing element between wave length λ1=optical signal 3-81 and wave length λ2=optical signal 3-82 in addition to wave length λ1=optical signal 3-81, wave length λ2=optical signal 3-82 and wave length λ3=optical signal 3-83. The above mentioned Δλ is the difference between the wave length λ1 and the wave length λ2. The wave length λ3=optical signal 3-83 which is arranged at equal spacings interferes with the wave length λ2+Δλ=four wave mixing optical signal element 3-85, resulting in deterioration of the signal to noise ratio of the wave length λ3 optical signal. The optical component of the C-band has been already commercially available, has a low cost, and is supplied sufficiently. So far, there has been an idea to use a wave length range from 1570 to 1600 nm or the L-band because the wave length of the L-band does not show any chromatic dispersion and is arranged at equal spacing when it is applied to the DSF transmitting path. However, when the optical component of the L-band is not supplied sufficiently, the length of a fiber used to amplify is large in principle, and the use of the L-band needs a high cost to introduce a mechanism which avoids a reduction of the excitation efficiency or a temperature dependency.

In the present embodiment, the method to apply the multiplex wave length of the C-band to the DSF optical fiber transmitting path is described. The four wave mixing is a phenomenon that, when the wave length at equal spacings is −3.5 dBm or more than −3.5 dBm per optical channel, an adjacent wave length element generated by the four wave mixing becomes larger, resulting in a deterioration of the signal. The conventional optical fiber transmitting path has used a high rate such as 2.5 Gbit/s and 10 Gbit/s. Therefore, an optical output of −3.5 dBm does not have a difference from the minimum reception sensitivity due to the noise restriction, resulting in an impractical transmitting distance. For example, when pin-PD is used, the optical output is −18 dBm at 2.5 Gbit/s and −14 dBm at 10 Gbit/s. Considering the restriction due to the signal to noise ratio (SNR or S/N), when seven relay optical amplifiers with noise figure (NF) of 7 dB are used, the minimum reception sensitivity is −24 dBm at 2.5 Gbit/s and −18 dBm at 10 Gbit/s. In the optical fiber transmission loss, the maximum compensation is 14 dB at 2.5 Gbit/s and 8 dB at 10 Gbit/s, and in consideration of a dispersion of 4 dB, the compensation is 10 dB at 2.5 Gbit/s and 4 dB at 10 Gbit/s at most, resulting in an impractical optical fiber transmitting path.

The transmitting rate of Gigabit Ethernet is 1.25 Gbit/s. Since the S/N in the rate of 1.25 Gbit/s is 3 dB better than that in the rate of 2.5 Gbit/s, the compensation of the optical fiber transmission loss is 12 dB. Therefore, the C-band optical fiber transmission of 20~40 km is possible with a small margin by using Gigabit Ethernet, but not by an optical fiber transmission system with the rate of 10 Gbit/s.

The exemplary embodiment according to the current invention describes, the transmitting method in the DSF optical fiber transmitting network transmitting an optical signal at the rate of 1.25 Gbit/s relayed via seven nodes at span intervals of 20~40 km, in which the optical level is reduced to avoid the four wave mixing specific to DSF caused in the C-band. When the span loss is around 12 dB, one relay optical amplifier is enough for one node. Either a front optical amplifier or a rear optical amplifier is used. The relay optical amplifier functions as an optical channel which passes through the node. Considering that the optical level of the optical channel drops within the node, the present embodiment uses a front optical amplifier to ensure the level of the optical input to an optical receiver because the optical input to the optical receiver is not enough when the optical level is reduced. In other words, the present embodiment has a margin of 10 dB for the reception level of 30 dBm per unit in the optical receiver, when the optical input to the optical receiver is increased to more than −20 dBm by amplifying the minimum level of the optical reception of −27 dBm using the front optical amplifier on condition that the maximum optical output from the node is −3.5 dBm, the minimum of that is −14 dBm, the span loss is 12 dB and the transmitting path penalty is 1 dB.

The present invention provides an optical network which has a common component without depending on a type of a signal connected to a client, a type of a transmitting path and a wave range used. When a dispersion shifted optical fiber is used in an optical fiber transmitting path, a wave length which shows no chromatic dispersion is in the vicinity of 1552 nm. Therefore, when wave lengths within a wave length range of the C-band at equal spacings are used for the conventional optical fiber transmitting path with a distance of more than 40 km stipulated in the ITU-T, the cost of an optical component is inexpensive. However, the interference mode between two wave lengths called a four wave mixing places the waves with the wave length above other signals or other waves at equal spacings, resulting in a phenomenon where an optical transmission characteristic is deteriorated. In a multiplex wave length transmission using a dispersion shifted optical fiber, one object is how to use inexpensive optical components for the C-band. The method named an unequal spacing has been described previously to remove the influence by the above mentioned phenomenon. However, the reduction of the high cost of an optical component used in the method was not achieved because the design of the optical component was complex. It is important to solve the above mentioned object.

The concern here, however, is the level input to the postamplifier. When the input level applied to an optical amplifier increases, greater optical excitation power is required to obtain the same gain. However, because the function of an optical amplifier in a transmission system design is to compensate for loss, excessively high optical level inputs are wasteful and tend to increase cost. In a 16-channel optical transmission path with 20-40 km spans, the span loss is approximately 12 dB. In such a system, an optical postamplifier with one excitation light source [(pump)] and a gain of approximately 20 dB with an optical input level of −20 dBm to −17 dBm will cause a high total system SNR in a configuration that is expandable up to 20 nodes. At higher optical levels beyond the above described levels, two-excitation-light-source optical postamplifiers are required. The network alternatively need to limit to less than 16 nodes if one excitation light source is used.

The above provided present example is a highly cost-effective system for transmitting 16-channel C-band wavelength-division multiplex signals in an SMF fiber transmission path with 12 dB span loss. The system uses comparatively low-output light sources and one-excitation-light-source optical amplifiers that are used as optical postamplifiers in each node of the 16-node system with amplifier per-channel input levels of −20 to −17 dBm. Amplifier gain is set to approximately 20 dB.

(2) Mixed Optical Fiber

A lower-cost C-band wavelength-division multiplex optical network is configured using a combination of G.652 and G.653-compliant fibers by using the optical levels specified in the above paragraph (1) for dispersion-shifted optical fiber.

According to the present invention as described above, medium-scale optical networks for IP communications are configured at a low cost: optical networks provide a steady cash flow due to a lower initial capital investment but are easily expandable through addition of facilities. Also, according to the present invention, optical networks use common components regardless of the kinds of transmission paths or wavelength bands. In addition, according to the present invention, in addition to making effective use of open transmission paths, a highly reliable two-fiber network is supported in the optical layer.

What is claimed is:

1. A wavelength division multiplexing optical network, comprising:
   a client;
   a plurality of redundant optical paths including a working path and a protection path; and
   a plurality of network nodes redundantly connected through said optical paths in a predetermined configuration, at least one of said network nodes being connected to said client, said network nodes transmitting and receiving optical signals with each other at a set of wavelengths, each of said network nodes further comprising;
   an optical add/drop multiplexer unit for converting a client optical signal at a first channel frequency from said client to a second channel frequency at one of said wavelengths to generate a converted client optical signal, said add/drop multiplexer unit splitting the converted client optical signal into split and converted redundant client optical signals for said optical paths, said add/drop multiplexer unit selectively multiplexing the split and converted redundant client optical signals to generate a wavelength division multiplexed optical signal, said add/drop multiplexer unit selectively demultiplexing the wavelength division multiplexed optical signal to generate a wavelength division demultiplexed optical signal;
   an optical signal failure detector connected to each of said optical paths for detecting a failure in the wavelength division demultiplexed optical signal to generate an optical path failure signal; and
   an optical switch unit connected to said optical paths in response to the optical path failure signal and having a first optical switch for switching from one of said optical paths to another of said optical paths.

2. The wavelength division multiplexing optical network according to claim 1 wherein the predetermined configuration is a ring structure.

3. The wavelength division multiplexing optical network according to claim 1 wherein the predetermined configuration is a liner structure.

4. The wavelength division multiplexing optical network according to claim 1 further comprises at least one main node and at least two local nodes.

5. The wavelength division multiplexing optical network according to claim 4 wherein said local nodes directly transmit the optical signals with each other without said main node.

6. The wavelength division multiplexing optical network according to claim 4 wherein said main node receives every one of the optical signals at one of said wavelengths from one of said local nodes and transmits the optical signals at a different one of said wavelengths to another of said local nodes.

7. The wavelength division multiplexing optical network according to claim 4 wherein said main node receives every one of the optical signals at one of said wavelengths from one of said local nodes and transmits optical signals at the same one of said wavelengths to the same one of said local nodes.

8. The wavelength division multiplexing optical network according to claim 1 wherein a number of the set of the wavelengths at each of said network node is flexibly modified.

9. The wavelength division multiplexing optical network according to claim 1 wherein said optical add/drop multiplexer unit further comprises:
   a transponder for converting the client optical signal at the first channel frequency from said client to the second channel frequency at one of said wavelengths to generate the converted client optical signal;
   an optical splitter connected said transponder to for splitting the converted client optical signal into the slitted and converted redundant client optical signals for said optical paths;
   a wavelength division multiplexer connected to each of said optical paths of said optical splitter for selectively multiplexing the slitted and converted redundant client optical signals to generate the wavelength division multiplexed optical signal; and
   a wavelength division demultiplexer connected to each of said optical paths of the wavelength division multiplexing optical network for selectively demultiplexing the wavelength division multiplexed optical signal to generate the wavelength division demultiplexed optical signal.

10. The wavelength division multiplexing optical network according to claim 9 wherein said optical add/drop multiplexer unit adds and drops a single channel frequency.

11. The wavelength division multiplexing optical network according to claim 9 wherein said optical switch unit further comprises a second optical switch and a third optical switch connected in series to said wavelength division demultiplexer for selectively connecting to said first optical switch to establish a drop route and to said wavelength division multiplexer to establish a through route.

12. The wavelength division multiplexing optical network according to claim 9 wherein said optical switch unit further comprises an optical coupler connected to said wavelength division demultiplexer for splitting the wavelength division demultiplexed optical signal and a fourth optical switch connected to said optical coupler for selectively connecting to said first optical switch to establish a drop route and to said wavelength division multiplexer to establish a through route.

13. The wavelength division multiplexing optical network according to claim 9 further comprises an optical amplifier connected to said wavelength division multiplexer for amplifying the wavelength division multiplexed optical signal.

14. A wavelength division multiplexing optical network, comprising:
   a client;
   a plurality of optical paths including dispersion shifted fibers with zero chromatic dispersion at a wavelength near 1552 nm, said dispersion shifted fibers transmitting optical input signals that are multiplexed at 200

GHz interval within C-band having a wavelength range from 1530 nm to 1560 nm; and a plurality of network nodes connected through said optical paths in a predetermined configuration of a ring structure, at least one of said network nodes being connected to said client, said network nodes transmitting and receiving a plurality of optical signals with each other at a set of wavelengths;

a router connected to each of said network nodes for selecting one of said optical paths for transmitting one of the optical signals; and an optical signal failure detector connected to each of said optical paths and said router for detecting a failure in the optical signal to generate an optical path failure signal for a particular one of said optical paths, wherein said router in response to the optical path failure signal switching from the particular one of said optical paths to another of said optical paths for transmitting the one of the optical signals, wherein each optical channel is less than −3.5 dBm, optical modulation speed is 2.48 Gbits/second, and inter-node span loss is less than 12 dB at 40 km.

15. A method of wavelength division multiplexing for an optical network, comprising:

providing a plurality of redundant optical paths including a working path and a protection path as well as a plurality of network nodes redundantly connected through the optical paths in a predetermined configuration, at least one of the network nodes being connected to a client;

transmitting and receiving optical signals to and from the network nodes at a set of wavelengths, said transmitting and receiving further comprising:

converting a client optical signal at a first channel frequency from the client to a second channel frequency at one of the wavelengths to generate a converted client optical signal;

splitting the converted client optical signal into slitted and converted redundant client optical signals for the optical paths;

selectively multiplexing the slitted and converted redundant client optical signals to generate a wavelength division multiplexed optical signal;

selectively demultiplexing the wavelength division multiplexed optical signal to generate a wavelength division demultiplexed optical signal;

detecting a failure in the wavelength division demultiplexed optical signal to generate an optical path failure signal; and switching from one of said optical paths to another of said optical paths in response to the optical path failure signal.

16. The method of wavelength division multiplexing for an optical network according to claim 15 wherein the predetermined configuration is a ring structure.

17. The method of wavelength division multiplexing for an optical network according to claim 16 wherein the predetermined configuration is a liner structure.

18. The method of wavelength division multiplexing for an optical network according to claim 15 wherein the network nodes include at least one main node and at least two local nodes.

19. The method of wavelength division multiplexing for an optical network according to claim 18 wherein the local nodes directly transmit the optical signals with each other without said main node.

20. The method of wavelength division multiplexing for an optical network according to claim 18 wherein the main node receives every one of the optical signals at one of the wavelengths from one of the local nodes and transmits the optical signals at a different one of the wavelengths to another of the local nodes.

21. The method of wavelength division multiplexing for an optical network according to claim 18 wherein said main node receives every one of the optical signals at one of the wavelengths from one of the local nodes and transmits optical signals at the same one of the wavelengths to the same one of the local nodes.

22. The method of wavelength division multiplexing for an optical network according to claim 15 further comprising flexibly modifying a number of the set of the wavelengths at each of the network node.

23. The method of wavelength division multiplexing for an optical network according to claim 15 wherein said multiplexing and said demultiplexing add and drop a single channel frequency.

24. The method of wavelength division multiplexing for an optical network according to claim 15 further comprising selectively connecting to establish a drop route and to establish a through route.

25. The method of wavelength division multiplexing for an optical network according to claim 15 further comprising amplifying the wavelength division multiplexed optical signal.

26. A method of wavelength division multiplexing for an optical network, comprising:

providing a plurality of optical paths and a plurality of network nodes connected through the optical paths in a predetermined configuration, at least one of said network nodes being connected to a client;

providing dispersion shifted fibers with zero chromatic dispersion at a wavelength near 1552 nm in the optical paths;

transmitting and receiving a plurality of optical signals among the network nodes at a set of wavelengths;

selecting one of the optical paths for transmitting one of the optical signals for optimal through traffic;

detecting a failure in the optical signal to generate an optical path failure signal for a particular one of the optical paths; and switching from the particular one of the optical paths to another of the optical paths for transmitting the one of the optical signals in response to the optical path failure signal, wherein the optical input signals are multiplexed at 200 GHz interval within C-band having a wavelength range from 1530 nm to 1560 nm in the dispersion shifted fibers, each optical channel being less than −3.5 dBm, optical modulation speed being 2.48 Gbits/second, inter-node span loss being less than 12 dB at 40 km.

27. The method of wavelength division multiplexing for an optical network according to claim 26 wherein the predetermined configuration is a ring structure.

* * * * *